US012802283B2

(12) United States Patent
Richarte et al.

(10) Patent No.: US 12,802,283 B2
(45) Date of Patent: Nov. 17, 2026

(54) APPARATUS AND SYSTEM FOR SELECTIVE DATA COMPRESSION

(71) Applicant: Urugus S.A., Montevideo (UY)

(72) Inventors: Gerardo Gabriel Richarte, Caba (AR); David Vilaseca, Caba (AR)

(73) Assignee: Urugus S.A., Montevideo (UY)

( * ) Notice: Subject to any disclaimer, the term of this patent is extended or adjusted under 35 U.S.C. 154(b) by 317 days.

(21) Appl. No.: 18/561,704

(22) PCT Filed: May 17, 2022

(86) PCT No.: PCT/US2022/029551
§ 371 (c)(1),
(2) Date: Nov. 16, 2023

(87) PCT Pub. No.: WO2022/245766
PCT Pub. Date: Nov. 24, 2022

(65) Prior Publication Data
US 2024/0242392 A1 Jul. 18, 2024

Related U.S. Application Data

(60) Provisional application No. 63/201,913, filed on May 18, 2021.

(51) Int. Cl.
*G06T 9/00* (2006.01)
*G06T 3/4046* (2024.01)
(Continued)

(52) U.S. Cl.
CPC ............ *G06T 9/002* (2013.01); *G06T 3/4046* (2013.01); *G06T 9/20* (2013.01); *G06V 20/13* (2022.01)

(58) Field of Classification Search
None
See application file for complete search history.

(56) References Cited

U.S. PATENT DOCUMENTS 6,429,811 B1 * 8/2002 Zhao ...................... G01S 19/27 342/357.66
6,507,618 B1 * 1/2003 Wee .................... H04N 19/159 375/E7.076

(Continued)

OTHER PUBLICATIONS

PCT Search Report and Written Opinion mailed on Sep. 29, 2022, for PCT Application No. PCT/US22/29551, 12 Pages.

(Continued)

*Primary Examiner* — Anand P Bhatnagar
(74) *Attorney, Agent, or Firm* — Lee & Hayes, P.C.

(57) ABSTRACT

Apparatuses, methods and systems for selective data compression are described. Apparatuses for selective data compression comprise one or modules executable to analyze data to generate analysis results, determine and associate appeal factor values with the data or portions thereof, and compress the data with the compression configurations associated with the appeal factor values. The apparatuses may be employed to compress data on-board manned or unmanned aerial vehicles or other devices. Through use of data analysis, including but not limited to artificial intelligence analysis, image analysis, meta-data analysis, in orbit analysis, and so forth, the manned or unmanned aerial vehicles may compress data collected, generated and/or stored in the vehicle based on data content, data contextual information, data collection opportunity, a priori information, change detection, and/or a particular task the vehicle is tasked to perform (application).

25 Claims, 4 Drawing Sheets

(51) Int. Cl.

| | |
|---|---|
| ***G06T 9/20*** | (2006.01) |
| ***G06V 20/13*** | (2022.01) |

(56) References Cited

U.S. PATENT DOCUMENTS

| | | | | |
|---|---|---|---|---|
| 6,553,150 | B1 * | 4/2003 | Wee | H04N 19/467<br>375/E7.206 |
| 6,973,130 | B1 * | 12/2005 | Wee | G06T 9/20<br>375/E7.182 |
| 7,720,601 | B2 * | 5/2010 | Zhao | H03M 7/30<br>342/357.42 |
| 9,160,362 | B1 * | 10/2015 | Ansari | H03M 7/3088 |
| 10,063,311 | B2 * | 8/2018 | Gopal | G01V 1/01 |
| 11,726,184 | B2 * | 8/2023 | Ferreira | G01S 17/894<br>356/4.01 |
| 2003/0011513 | A1 * | 1/2003 | Zhao | H04B 1/66<br>342/357.42 |
| 2014/0321561 | A1 * | 10/2014 | Stec | G06T 7/11<br>375/240.26 |
| 2015/0318916 | A1 * | 11/2015 | Gopal | B64G 1/1021<br>455/13.1 |
| 2015/0371431 | A1 * | 12/2015 | Korb | G06V 10/60<br>382/113 |
| 2016/0345018 | A1 * | 11/2016 | Sadhwani | H04N 19/587 |
| 2017/0251227 | A1 | 8/2017 | Dvir | |
| 2018/0239982 | A1 | 8/2018 | Rutschman | |

OTHER PUBLICATIONS

Indian Office Action mailed Aug. 11, 2026 for Indian Patent Application No. 202317083299, a foreign counter part if U.S. Appl. No. 18/561,704, 10 pages.

* cited by examiner

APPARATUS AND SYSTEM FOR SELECTIVE DATA COMPRESSION

CROSS REFERENCE TO RELATED APPLICATIONS

This application is a US national stage entry of International Patent Application No. PCT/US2022/029551, filed on May 17, 2022, which claims priority to U.S. Provisional Application No. 63/201,913, filed on May 18, 2021, entitled "APPARATUS AND SYSTEM FOR SELECTIVE DATA COMPRESSION", the entire contents of which are incorporated herein in their entirety by reference.

BACKGROUND

Several techniques exist to compress data in order to reduce its size and allow a reduction in the resources required to store and transmit the data. It is useful to have the possibility of compressing data in a variety of applications, especially those that require optimizing data processing resources such as storage space, computation time, computation complexity, data transmission, and so forth. By way of illustration, satellites, such as Earth-observation satellites, gather useful information from Earth and are able to generate a large amount of data, however the amount of data that can be received or transmitted by a satellite is limited in their bandwidths. There would be no point in increasing the capacity of the satellites to generate raw or processed data if these data could not be properly and timely stored or transmitted. Consequently, there is a need to provide efficient compression systems and techniques for improving satellite's storage/transmission capacity taking into account typical limitations and constraints of satellite communication bandwidth.

SUMMARY

Considerable advantages may be realized by providing data compression techniques, apparatuses and systems that may automatically select the compression configurations or algorithms, and parameters based, at least in part, on data content, data contextual information, a particular implementation or application, among other factors. As shown below in the text, apparatuses, systems and techniques for selective data compression may be useful for optimizing the processing, storage and transmission of data in numerous applications, especially in environmental monitoring, meteorology, cartography, agriculture, communication, among other useful purposes, from space-based (satellite-based), aerial-based or maritime-based systems. In non-limiting examples, satellite-based implementations illustrate some benefits and uses of the novel compression techniques and systems of satellite data, however other types of data and implementations may be also carried out with the described systems and techniques.

Generally, for satellite systems for planet observation, such as Earth observation, the amount of data, that is, satellite data, such as imagery data (images, sub-images, image-related data, metadata) and/or metadata, to be transmitted by a satellite to a ground-based station or to another vehicle such as another satellite is limited, among other factors, by the period of time during which the satellite is available for radio communication. In some circumstances, the satellite may select the imagery data to be sent to a ground-based station, for example by downloading only the parts of the imagery data that are relevant for a given application. However, this remedy may discard useful information already generated by the satellite. Hence, it would be a considerable advantage if the satellite had the capability to determine compression configurations, including compression parameters, type or degree of compression, loss factors, and/or acceptable compression error, for some or all of the images, sub-images, or image-related data to be transmitted by the satellite. Substantial advantages can be realized by equipping satellites with selective data compression capabilities that enable them to selectively choose the compression configurations based on a variety of factors, such as based on data content or on opportunity, to compress satellite data to be stored and/or transmitted.

Therefore, according to an aspect, there is provided a system for selective data compression, the system comprising: one or more processors; and a memory coupled to the one or more processors, the memory including one or more modules that are executable by the one or more processors to: analyze one or more parts of data to create analysis results; determine, based at least in part on the analysis results, at least one appeal factor value or at least one range of appeal factor values; associate the at least one appeal factor value or the at least one range of appeal factor values with the one or more parts of the data; determine at least one compression configuration for the at least one appeal factor value or the at least one range of appeal factor values; and compress the one or more parts of the data based at least in part on the at least one compression configuration to obtain compressed one or more parts of the data.

According to an aspect, there is provided a system for selective data compression, the system comprising: one or more processors; and a memory coupled to the one or more processors, the memory including one or more modules that are executable by the one or more processors to: analyze one or more parts of data to create analysis results; associate, based at least in part on the analysis results, at least one compression configuration to the one or more parts of the data; and compress the one or more parts of the data based at least in part on the at least one compression configuration to obtain compressed one or more parts of the data.

Selective data compression apparatuses, processes, or systems provide several technical advantages. For example, the possibility of selecting the compression configurations to compress or encode the data to be transmitted by a satellite can increase or maximize bandwidth utilization, by reducing the overall size of the data without losing relevant data. Additionally, rather than compressing the satellite data uniformly, the satellite may be able to partition, segment or divide the data and compress each part, segment or section with predetermined compression configurations, prioritizing the acquisition, storage and/or transmission of valuable data.

Throughout the present description, appeal factor or appeal factor value may be used interchangeably.

According to at least one embodiment of the present disclosure, the analysis results comprise at least one of radiofrequency, RF, data analysis, image data analysis, sound data analysis, meta-data analysis, substance analysis, sensor data analysis, and artificial intelligence, AI, analysis.

According to at least one embodiment of the present disclosure, the at least one compression configuration is associated to the one or more parts of the data based at least in part on a level of importance, significance, or usefulness associated with the one or more parts of the data, a priori information, an application the system is tasked to perform, or content of the data.

According to at least one embodiment of the present disclosure, the one or more modules are executable by the one or more processors to assign, based at least in part on the analysis results, at least one appeal factor value or at least one range of appeal factor values to the one or more parts of the data, associate the at least one compression configuration to the at least one appeal factor value or the at least one range of appeal factor values, and compress the one or more parts of the data based at least in part on the at least one compression configuration.

According to at least one embodiment of the present disclosure, the at least one appeal factor value or the at least one range of appeal factor values provide information about a level of importance, significance, or usefulness associated with the one or more parts of the data, based at least in part on at least one of a priori information, an application the system is tasked to perform, or content of the data. By associating at least one appeal factor value or at least one range of appeal factor values, or at least one compression configuration, with one or more parts of the data, different parts of the data may be associated with different appeal factor values, depending on the level of importance, significance or usefulness associated with said one or more parts of the data, including associated with particular applications for said data. This in turn allows to apply different compression configurations to different parts of the data, thereby making a more efficient use of the system resources by compressing more the parts of data that comprise less important information, and compressing less or not compressing at all the parts of data that comprise more important information.

According to at least one embodiment of the present disclosure, the at least one appeal factor value or the at least one range of appeal factor values comprise continuous values, discrete values, or a combination thereof, and the at least one range of appeal factor values is divided regularly or irregularly, following at least one of a logarithmic partition, gradually decreasing partition, gradually increasing partition, quantiles partition, custom partition, or any combination thereof.

According to at least one embodiment of the present disclosure, the at least one compression configuration is determined by selecting compression algorithms, parameter values of a compression algorithm, and/or compression parameters. According to at least one embodiment of the present disclosure, the compression parameters include at least one of storage and/or transmission conditions, error conditions, or quality conditions, such as a maximum acceptable compression loss. According to at least one embodiment of the present disclosure, the compression algorithms include algorithms based on lossless compression techniques, near-lossless compression techniques, lossy compression techniques, artificial intelligence techniques, and combinations thereof.

According to at least one embodiment of the present disclosure, the at least one appeal factor value or the at least one range of appeal factor values are determined or assigned to the one or more parts of the data based at least in part on at least one of: a database updated according to at least one of predetermined time intervals, predetermined areas, predetermined locations, pixel age, data acquisition opportunity cost, or data acquisition patterns.

According to at least one embodiment of the present disclosure, the system further comprises at least one imaging sensor, and the one or more modules are further executable by the one or more processors to: acquire, by the at least one imaging sensor, image data, wherein the analysis of the one or more parts of the data to create analysis results comprises the analysis of the image data to identify at least one characteristic of interest; and wherein the association of the at least one compression configuration with the one or more parts of the data is done based at least in part on the characteristic of interest.

According to at least one embodiment of the present disclosure, the at least one imaging sensor comprises at least one of optical sensors, synthetic aperture radar (SAR) sensors, and area imaging sensors having a plurality of pixel sensors.

According to at least one embodiment of the present disclosure, the system further comprises manned or unmanned aerial or space vehicles, wherein the at least one imaging sensor is on-board at least one of the manned or unmanned aerial or space vehicles. According to at least one embodiment of the present disclosure, the manned or unmanned aerial or space vehicles comprise artificial satellites. According to at least one embodiment of the present disclosure, the system further comprises at least one of fixed cameras such as surveillance cameras or web cameras, robots, ground or maritime vehicles.

According to at least one embodiment of the present disclosure, the at least one compression configuration is associated with the one or more parts of the data based at least in part on properties, parameters or conditions caused by, or related to, the at least one characteristic of interest.

According to at least one embodiment of the present disclosure, the at least one characteristic of interest comprises information related to at least one of a list comprising: image characteristics, an object or feature of interest on the image data, a geographical region of the Earth or target celestial body, a temperature of the system, data from other sensors in the system, exposure time of image capture, an application the system is tasked to perform, contextual information of objects or features of interest on the image data, changes of objects or features of interest detected on an image or a sequence of images of the image data, changes detected in the status of objects or features of interest, or periods of time of image capture.

Image characteristics may include noise, dynamic range, blur, or the like. An application the system is tasked to perform, a temperature of the systems, data from other sensors, exposure time of image capture, and a geographical region can be considered contextual information.

In a non-limiting example, the selection of the compression configuration to compress satellite data can optimize bandwidth utilization, as illustrated in the following scenario. A satellite may capture images of a determined geographical zone, however not all images may contain useful information. Hence, the satellite may select which images or portions of images (i.e. sub-images) contain valuable or useful information for a given application and which images or sub/images do not contain valuable or useful information, for example based on a-priori information combined or not with image content. The satellite may even detect which images or sub-images are partially or completely obstructed and therefore contain no relevant information. The images or sub-images may be assigned an appeal factor based at least in part on whether said images or sub-images contain valuable or useful information, and based on the appeal factor, an image or sub-image may be compressed with a determined compression algorithm, so that images or sub-images containing valuable or useful information are compressed with a low compression loss factor (i.e. having higher quality or resolution) and the images or sub-images containing less relevant, less useful, useless or irrelevant information for the given application are compressed with a high compression loss factor (i.e.

having lower quality or resolution). By operating in this manner, the net bandwidth utilization can be reduced or minimized by reducing the overall amount of data (e.g., overall size of the set of data, such as images) that is to be transmitted to a ground-based station.

In another non-limiting example, the compression configuration may be selected based on content, as exemplified in the following situation. For example, the satellite imagery data may be analyzed and an image may be divided and/or classified in different segments, classes or areas, so that some or all the different segments, classes or areas may be subsequently assigned or may be associated with an appeal factor or range of appeal factors. Subsequently, some or all of the segments, classes or areas of the image may be compressed based at least in part on the appeal factor or range of appeal factors, wherein the value or range of values of the appeal factor(s) is associated with a determined compression configuration (e.g. none, low, intermediate or high compression loss factor). By operating in this manner, one or more parts of data may be compressed determining a semantic compression technique. This could be the case, for example, when the satellite captures an image containing mountains and houses. In some applications, it would be desirable to have a high-resolution image of the houses and there could be no interest in imaging the mountains. Therefore, it would be an advantage if the portions of the image having relevant information (information about the houses) could be compressed with a low compression ratio and/or a reduced loss factor and the portions of the image that are irrelevant or less relevant (information about the mountains) may be compressed with a high compression ratio and/or an increased loss factor. The advantage of still sending the portions of image with a high compression ratio and/or increased loss factor instead of discarding them is the possibility of keeping at least basic information of the less relevant or irrelevant areas in case an anomaly is present in those areas, allowing its detection even though it is not the main target, as could be the case of an avalanche being taking shape on the mountains next to the houses. In some instances, instead of whole segments or areas, the appeal factor may be assigned to each pixel of the image, so that each pixel may be compressed, based at least in part on the appeal factor, with a predetermined compression configuration.

In another non-limiting example, the satellites may be equipped with on-board processing capabilities in order to select, while in-orbit, the compression configuration to be applied to the satellite data. For example, the satellite may acquire imagery data and, by analyzing the images in-orbit (e.g. segmenting, classifying, determining a number of instances of a semantic object of a predetermined class, and so forth) and/or metadata of the imagery data, the satellite may identify meaningful data from the images, such as objects or features of interest on the Earth. The relevance may be determined on-board or received from the ground or another vehicle, such as another satellite. Based at least in part on the relevance of the objects or features of interest within the image, the satellite may assign an appeal factor to different portions or classes within the image. In turn, each appeal factor value or a range of appeal factor values may be associated with a compression configuration based on quality and/or error conditions for each portion or class within the image. Ultimately, the satellite may compress the different portions or classes within the image with the compression configuration associated with the appeal factor value or a range of appeal factor values assigned to them. In certain examples, no appeal factor or range of appeal factor values may be determined, and based at least in part on the relevance of the objects or features of interest within the image, the satellite may associate a compression configuration with different portions or classes within the image. By operating in this manner, the satellites may determine the compression configuration while in orbit in order to determine the degree or level of compression of the imagery data (images and/or subimages), providing a direct gain in the amount of information that can be sent to the ground or to other satellites.

In another non-limiting example, the compression configuration may be selected based on change detection, as illustrated in the following situation. For example, a satellite may acquire imagery data and may execute algorithms to detect differences or changes between the acquired imagery data and reference data or multi-temporal imagery data sets. After detecting changes, the satellite may assign appeal factors based on the changes or, in some implementations, may execute algorithms to determine appeal factors based on the changes, so that an (range of) appeal factor value is related to the data that has not changed and another (range of) appeal factor value is related to the data that has changed. The satellite may further associate a compression configuration comprising a higher compression ratio and losses to the (range of) appeal factor value related to data that has not changed, and may associate a compression configuration comprising a lower compression ratio with minimal or no losses to the (range of) appeal factor value related to data that has changed. The satellite may compress the changed and/or unchanged data using the compression configuration associated with the (range of) appeal factor value. In some instances, only the differences or changes detected between imagery data may be compressed based on appeal factor values and their associated compression configurations.

For example, a satellite may detect changes between images and may assign appeal factors only to the portions of images (sub-images) that have changed, in order to compress the differences between images with the compression configurations associated with the appeal factors assigned to the portions that have changed. In some instances, the appeal factors are assigned to the different portions of the image and, if the satellite detects changes in the portions having preselected values of appeal factors, those portions are compressed with the compression configurations associated to those appeal factors. In some cases, no appeal factors may be assigned, and the portions that have changed may be directly associated with compression configurations. The multi-temporal imagery data sets may comprise imagery data previously acquired by the satellite and/or any imagery data stored or received from the ground or from another satellite. The reference data may comprise any data, usually received from the ground or from another satellite, that serves as basis or standard for detecting changes between different types of data. The changes may be first order changes, such as terrain changes including for example harvested fields and unharvested fields, dry geographical regions and humid geographical regions, floods or droughts, and so forth, or may be higher order changes such as when comparing the output of segmentation or detection algorithms.

For example, the satellite may capture an image (or a sequence of images) from a region of interest on Earth, such as a particular city or field. The satellite may apply segmentation or feature detection algorithms to detect objects or features of interest on Earth such as cars, buildings, roads, etc., and may compare the cars, buildings, roads, etc., detected in the captured image (or sequence of images) with the cars, buildings, roads, etc., detected in one or more images included in a time series of images of the same region of interest previously stored or captured by the satellite. After detecting changes between the objects detected on the captured images (or sequence of images) and the objects detected on the one or more images of the time series, the satellite may compress the image or portions of the image based on the found differences/changes by assigning (range of) appeal factor values for different portions of the image, associating a compression configuration with each of the (range of) appeal factor values (or directly associating a compression configuration to the different portions of the image), and compressing each portion of the image according to the (range of) appeal factor values or compression configurations. The portions of the image may include portions having objects or features of interest, portions representing the background, and/or portions having detected changes. The time series may be any given period of time such as a day, a month, a year, and so forth. For instance, the satellite may capture a sequence of images during a period of 24 hours and may detect that there is a difference between the number of parked cars and moving cars in the sequence of images (e.g. video frames) taken at successive times during the period of 24 hours, so the satellite may assign appeal factors associated to a compression configuration comprising a higher compression ratio and losses to the portions of the images having cars that have not changed (e.g. parked cars, or no cars), and may assign appeal factors associated with a compression configuration comprising a lower or no compression losses to the portions of the images that have changed (e.g. moving cars). The portions of images may be subsequently compressed with the compression configurations associated with the appeal factors.

Alternatively or additionally, the appeal factors may comprise a range of appeal factors which may be related to the degree of change. The satellite may also assign a range of appeal factors to the cars depending on the distance moved, so that the data may be compressed according to the distance that the cars have moved. In some instances, the satellite may detect changes on portions of an image when compared to previously captured or stored images and, if a change on those portions exceeds a predetermined threshold, the portions are assigned one appeal factor, and if a change on those portions is below the predetermined threshold the portions may be assigned another appeal factor or may be discarded. Each appeal factor is associated with compression configurations including at least one of compression parameters, compression algorithms, and/or parameter values of a compression algorithm. Alternatively or additionally, the satellite may assign the appeal factor value based on the periodicity of change of an object or feature of interest when it is compared for example with a threshold value, reference data or multi-temporal imagery data sets, and associate a compression configuration to the appeal factor value, so that the satellite may compress, based on the appeal factor value, for instance with a higher compression ratio and losses the images or sub-images that have a probability above a predetermined threshold of remaining unchanged, unless a change is detected.

In another non-limiting example, satellites may optimize the monitoring capabilities by prioritizing the acquisition of valuable data based on determining appeal factor values or assigning appeal factor values to one or more parts of the acquired data. For example, a client may want to monitor pipelines in a certain geographical region. In some instances, the pipelines in a satellite image may be detected by algorithms running on the ground or on-board the satellite, and each pipeline may be assigned (a range of) appeal factor values whereas the remaining parts of the image may be assigned different (a range of) appeal factor values. By operating in this manner, a map, layout, or chart of appeal factors may be determined, wherein each pixel or group of pixels of the image is assigned (a range of) appeal factor values. The determination of appeal factor values for each pixel or group of pixels of the image may be based on particular parameters related to the image such as objects or features of interest on the image, certain geographical regions of the Earth, an application the satellite is tasked to perform, contextual information of objects or features of interest on an image, changes of objects or features of interest detected on an image or a sequence of images, changes detected in the status of objects or features of interest, and/or periods of time of image capture, and so forth. The (range of) of appeal factor values may be further associated with compression configurations. Once the map of appeal factors is determined, each pixel or group of pixels of the image is correlated to a compression configuration and the satellite may compress the portions of captured or stored images, based on the map of appeal factors and the particular application.

In another non-limiting example, on-board generation, adaptation or modification of maps of appeal factors (i.e. appeal factor values) can allow the optimization of the compression of the acquired images. Different types of information may be used to determine a map of appeal factors. The map of appeal factors may be determined, for example, based on a particular application such as for analyzing or monitoring a geographical area for geological, forestry, agricultural meteorological, or some other useful purpose. As a way of illustration, in some instances when the aim of the satellite is to monitor buildings in a city, the map of appeal factors may assign a range of higher appeal factors to the portions of the image having buildings (or having higher probability of being buildings) and a range of lower appeal factors to the portions of the image showing parks, streets and cars (or having less probability of being buildings). The layout (map, chart) of appeal factors may be determined based in part on the particular application and in part on the geographical region. The layout of appeal factors may be determined on the ground or in another satellite and may be subsequently uploaded to the satellite, or may be generated by the satellite itself. In some instances, the layout may be generated partially on the ground and partially on board the satellite, or it may be generated partially on board several satellites optionally including the ground. After receiving the layout (map) of appeal factors, the satellite may store the layout for subsequent use, so that, when the satellite captures images of a particular geographical region included in the layout, after analyzing the captured images, the satellite may determine, based at least in part on the layout of appeal factors for that region, which areas are relevant and which are not. In addition, each appeal factor or a range of appeal factors is associated with a compression configuration. As a result, the satellite may determine, based on the layout of appeal factors assigning relevance to the parts of the image, how to compress the different parts or areas of the captured image, so that rather than sending numerous images with the same level of compression for both relevant and irrelevant or less relevant parts or areas for a particular application, the satellite may transmit with minimal loss only the relevant parts or areas, reducing the required bandwidth for data transmission. In some implementations, the map/layout of appeal factors may be updated based on the data or meta-data, for example based on observations acquired and/or received at predetermined or preselected time intervals, areas or geographical locations.

In another non-limiting example, the appeal factors may be assigned or determined, directly or indirectly, based on the output of an artificial intelligence (AI) system, such as a form of neural network (NN). The AI system may be trained and/or re-trained to directly assign or determine an appeal factor value to the whole or portions of data, for example to each pixel or portion of an image according to the application where the image is going to be used, so that instead of detecting the presence or the probability of the presence of an object of interest such as cars, houses or a river, the AI system may be trained to directly assign, and/or in some instances determine, the appeal factor value of the pixels or set of pixels of the image or sequence of images. In some instances, the AI system may be used for data analysis and may provide by-product information that may be used by the apparatuses and systems for selective data compression for assigning or determining the appeal factor values and/or associating the compression configurations with the appeal factor values, in order to selectively compress the different portions of data.

In another non-limiting example, the selective compression apparatuses, systems and techniques may determine the compression configuration based on data analysis for compressing data other than image data. For example, a satellite receiving or transmitting RF signals or time series of RF signals may divide the signal into groups of signals grouped by their frequency, phase, or by other signal parameter, and the selective data compression system may assign an appeal factor value (or range of appeal factors values) to each group of signals, based at least on signal parameters, signal content and/or application. The selective data compression system may subsequently associate a compression configuration having a particular level or degree of compression and/or loss factors with each appeal factor value. Similarly, appeal factor values and their corresponding compression configurations may be assigned to each frequency or time window in some instances determined by content. For example, if a satellite sensor records a wide frequency spectrum, the selective data compression system may assign an appeal factor value for each signal based on its frequency. Given that the appeal factor value is linked to a compression configuration, the selective data compression system may compress with high resolution (less compression ratio and/or loss factor) only at times when a signal and/or energy is detected, and/or may compress with high resolution at preselected frequency bands.

According to at least one embodiment of the present disclosure, the analysis of the image data comprises comparing the image data with received and/or acquired data, reference data, or multi-temporal imagery data sets to identify at least one change on the at least one characteristic of interest, and the association of the at least one compression configuration with one or more parts of the data is based on the identified at least one change.

According to at least one embodiment of the present disclosure, the one or more modules are further executable by the one or more processors to store and/or transmit the compressed one or more parts of the data.

According to at least one embodiment of the present disclosure, the one or more modules are further executable by the one or more processors to compress the one or more parts of the data by generating a set of compressed data units such that each compressed data unit of the set of compressed data units is compressed based on a loss or difference accumulated throughout the set of compressed data units.

According to at least one embodiment of the present disclosure, the one or more modules are further executable by the one or more processors to associate the at least one compression configuration with the one or more parts of data, and/or analyze the one or more parts of the data based at least in part on executable code stored in the system or received by the system.

According to a further aspect, there is provided satellite comprising: one or more processors; and memory coupled to the one or more processors, the memory including one or more modules that are executable by the one or more processors to: analyze data to create analysis results; associate, based at least in part on the analysis results, at least one compression configuration with the one or more parts of the data; and compress the data or the one or more parts of the data based at least in part on the at least one compression configuration to obtain compressed one or more parts of the data.

According to at least one embodiment of the present disclosure, the analysis results comprise at least one of radiofrequency, RF, data analysis, image data analysis, artificial intelligence, AI, analysis, meta-data analysis, substance analysis and sensor data analysis. According to at least one embodiment of the present disclosure, the at least one compression configuration is associated with the one or more parts of the data based at least in part on artificial intelligence, AI, analysis, the output of AI analysis, by-product data related to the output of AI analysis, or heat maps of appeal factor values.

According to at least one embodiment of the present disclosure, the data comprises an image or a sequence of images and the AI analysis provides, directly or indirectly, information of the importance or usefulness of pixels or group of pixels of the image or the sequence of images for a particular application or task to be performed by the satellite to associate the at least one compression configuration with the one or more parts of the data.

According to at least one embodiment of the present disclosure, the AI analysis is performed by neural networks trained Earth-side and then instantiated and evaluated on the satellite in flight, or neural networks whose training or re-training is ongoing on-board the satellite during its operational lifecycle.

According to at least one embodiment of the present disclosure, to associate the at least one compression configuration with the one or more parts of the data, the one or more modules are further executable by the one or more processors to assign, based at least in part on the analysis results, appeal factor values or at least one range of appeal factor values to the one or more parts of the data, and associate the at least one compression configuration to the at least one appeal factor value or the at least one range of appeal factor values.

According to at least one embodiment of the present disclosure, the one or more modules are further executable by the one or more processors to generate or receive a map of appeal factor values and assign, based at least in part on the map of appeal factor values, the appeal factor values or the at least one range of appeal factor values to the one or more parts of the data.

According to at least one embodiment of the present disclosure, the map of appeal factor values correlates the appeal factor values or the at least one range of appeal factor values to portions of image data corresponding to a geographical area or region on the surface of the Earth.

According to at least one embodiment of the present disclosure, the map of appeal factor values is dynamically updated at preselected times, areas or locations, based at least in part on pixel age, data acquisition opportunity cost, or data acquisition patterns.

According to at least one embodiment of the present disclosure, the one or more modules are further executable by the one or more processors to assign, from the map of appeal factor values, appeal factor values for a pixel or group of pixels of an image based at least in part on a geographical region on the Earth, an application the satellite is tasked to perform, objects or features of interest on an image, contextual information of objects or features of interest on an image, changes of objects or features of interest detected on an image or a sequence of images, and/or changes detected in the status of objects or features of interest.

According to at least one embodiment of the present disclosure, the satellite further comprises one or more sensors configured to collect the data.

According to at least one embodiment of the present disclosure, the data comprises imaging data and the analysis results include determining objects or features of interest on the surface on the Earth or target celestial body. According to at least one embodiment of the present disclosure, the at least one compression configuration is associated with the one or more parts of the data based at least in part on a parameter, a frequency or a trigger condition related to the objects or features of interest on the surface on the Earth or target celestial body.

According to at least one embodiment of the present disclosure, the one or more modules are executable by the one or more processors to further store the compressed one or more parts of the data in the memory for further processing, for transmission to another location, or for further analysis.

According to at least one embodiment of the present disclosure, the one or more modules are further executable by the one or more processors to compress the one or more parts of the data by generating a set of compressed data units such that each compressed data unit of the set of compressed data units is compressed based on a loss or difference accumulated throughout the set of compressed data units.

According to a further aspect, there is provided a computer-implemented method for selective data compression, comprising analyzing one or more portions of data to create analysis results; associating, based at least in part on the analysis results, at least one compression configuration with the one or more portions of the data; and compressing the one or more parts of the data based at least in part on the at least one compression configuration to obtain compressed data.

According to at least one embodiment of the present disclosure, the method further comprises assigning, based at least in part on the analysis results, at least one appeal factor value to the one or more parts of the data; and associating the at least one compression configuration with the at least one appeal factor value.

According to at least one embodiment of the present disclosure, the data comprises image data comprising an image or sequence of images, the method further comprising: generating one or more masks; associating each of the one or more masks with at least one compression configuration of the at least one compression configuration or with an appeal factor value of the at least one appeal factor value associated with the at least one compression configuration; multiplying the image or at least one image of the sequence of images by each of the one or more masks; and compressing each of the multiplied images using the at least one compression configuration associated with the one or more masks or associated with the at least one appeal factor value associated with the one or more masks.

According to at least one embodiment of the present disclosure, the method further comprises dividing, based at least in part on the analysis results, the data in one or more blocks of regular or irregular shape and of the same or different size.

According to at least one embodiment of the present disclosure, the method further comprises: associating at least one block of the one or more blocks with at least one compression configuration of the at least one compression configuration; and compressing the at least one block based on the at least one compression configuration.

According to at least one embodiment of the present disclosure, the method further comprises: determining a block appeal factor value for each of the one or more blocks; associating block appeal factor values of the one or more blocks with compression configurations; and compressing the one or more blocks based on the block appeal factor values.

According to at least one embodiments of the present disclosure, the method further comprises: dividing, based on the at least one appeal factor value, the data in one or more contour lines; associating at least one contour line of the one or more contour lines with a compression configuration of the at least one compression configuration or with an appeal factor value of the at least one appeal factor value associated with the at least one compression configuration; and compressing the data based on the one or more contour lines; wherein each contour line comprises portions of the data delimited by predetermined threshold appeal factor values.

According to at least one embodiments of the present disclosure, the one or more contour lines are further divided in one or more blocks having the same or different sizes; each of the one or more blocks is assigned a block appeal factor value based on the appeal factor values included in each block; the block appeal factor values are associated with one or more compression configurations of the at least one compression configuration; and the one or more blocks are compressed based on each block appeal factor value.

According to at least one embodiments of the present disclosure, compressing the one or more portions of the data comprises generating a set of compressed data units such that each compressed data unit of the set of compressed data units is compressed based on a loss or difference accumulated throughout the set of compressed data units in a way that the whole set of compressed data represents the data or the portion of the data.

According to at least one embodiment of the present disclosure, compressing the one or more portions of the data comprises: a) compressing the one or more portions of the data with a first compression configuration associated with a first appeal factor value to obtain a first compressed unit and a first difference unit; b) compressing the first difference unit with a second compression configuration and a second appeal factor value, the second compression configuration and the second appeal factor value being the same as or different from the first compression configuration and the first appeal factor value; and c) repeat steps a) and b) starting from each subsequent difference unit, with same or different compression configurations and appeal factor values, until a difference unit is obtained with an amount of information lower than a difference threshold, wherein optionally the difference threshold is related to the appeal factor values.

It should be understood that any of the features exemplified in the preceding examples may be combined with each other, for instance, the systems, methods and apparatuses may be configured to selectively assign or determine appeal factor values, ranges of appeal factor values, maps, layouts, or charts of appeal factor values, compression configurations and/or loss factors, associations with compression configurations comprising compression parameters and/or compression algorithms, in some instances using AI, by processing the data on the ground or onboard an unmanned or manned aerial or space vehicle; wherein the determination may be based on data content, data acquisition opportunity, change detection, data parameters, data analysis, and so forth. Data may be compressed as a whole or in portions (e.g. images, sub-images, pixels, frequencies). For example, a selective data compression system may assign or determine (a range of) appeal factor values and may associate the (range of) appeal factor values with a compression configuration comprising a low compression ratio and/or loss factors to portions of an image that have buildings (i.e. objects or features of interest), and/or that contain larger changes detected from previous captures (i.e. change detection), and/or that contain high levels of anomalies detected either within the image or from previous captures (i.e. based on data content, application or contextual information), and so forth.

BRIEF DESCRIPTION OF THE DRAWINGS

The Detailed Description is set forth with reference to the accompanying figures. In the figures, the left-most digit(s) of a reference number identifies the figure in which the reference number first appears.

The use of the same reference numbers in different figures indicates similar or identical items.

DETAILED DESCRIPTION

Overview

Figure 1:
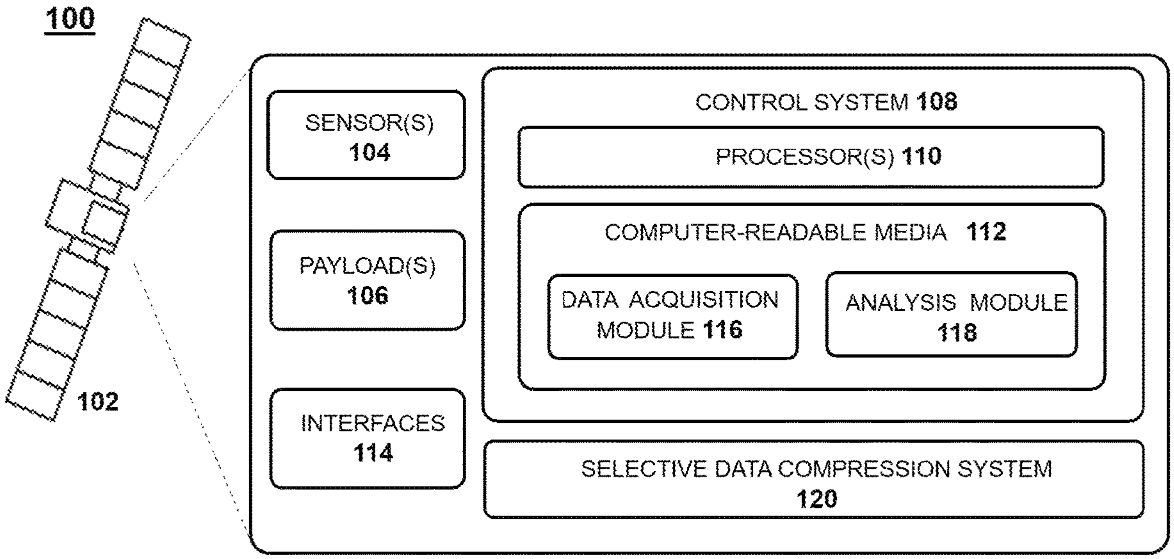
FIG. 1 is an illustration of a satellite-based system overview depicting a satellite including a selective data compression system according to embodiments of the present disclosure.

Embodiments include novel systems, methods and apparatuses for automated selection of compression configurations comprising compression parameters, compression algorithms, parameter values of a compression algorithm, and/or loss factors to selectively compress data, such as image, audio, video, electromagnetic signals, meta-data (e.g. telemetry, contextual information), and so forth. The automated selection may be performed by analyzing the data, determining or assigning compression configurations to the data or portions of data, and compressing the data or portions of data based on the compression configuration. In some implementations, the automated selection may be performed by analyzing the data or portions of data, determining or assigning appeal factor values to the data or portions of data, and compressing the data or portions of data based on the appeal factor. In some instances, the appeal factor is assigned or determined based at least in part on one of data content, meta-data, application, contextual information, among others. As used herein, "appeal factor values" or "appeal factor" refer to a value or measure of importance, significance, usefulness or appreciation given to parts or the whole data. For example, when the data comprises a set of images, the appeal factor may be an importance value assigned to each image of the set of images, to portions or segments on each image, or to each pixel of the images included in the set of images. Similarly, when the data comprises electromagnetic signals, the appeal factor may be an importance value assigned to the whole or portions of the signals according to the frequencies, time windows, and so forth. The importance or appreciation value may be determined based on diverse factors, for example, in some instances the importance value is determined based on the purpose or particular application. For example, a drone with an on-board sensor may collect information about the concentration of a gas to identify gas leaks from gas pipelines, and may consider as more important the gas concentration values collected closer to pipelines than closer to other sources of gas emissions such as livestock, among others. In some instances, the appeal factor(s) may be explicitly determined or assigned to one or more compression configurations, and in some instances, the appeal factor may be implicitly determined but not explicitly, and in such cases the one or more compression configurations are directly associated with parts or all the data based on the importance, significance, usefulness or appreciation given to said parts or all the data.

Embodiments include aerial or satellite-based systems having sensors, processors and memories, the memories including one or more modules that are executable by the processors to compress satellite data based on appeal factor values determined based at least in part on one of satellite data content, satellite meta-data, application the satellite is tasked to perform, contextual information related to the satellite data, and so forth. As used herein, satellite refers to artificial satellites or spacecrafts, but the scope also includes other manned or unmanned aerial or space vehicles such as balloons, drones, aircrafts, and so forth.

The processes, systems, and devices described herein may be implemented in a number of ways. Example implementations are provided below with reference to the following figures to aid in illustration, although those examples are not meant to be taken in a limiting sense.

Example of System for Selective Data Compression

Embodiments include apparatuses, systems or devices for selective data compression comprising one or more processors coupled to a memory which includes one or more modules that include instructions executable by the one or more processors. The modules allow the apparatus or system to analyze one or more parts of data to create analysis results. The analysis results may depend, among other factors, on the type of data (e.g. image data, RF signals, sensor data, meta-data (e.g. telemetry, the position of the vehicle or satellite system, and/or a health of the vehicle or satellite system or its subsystems)), on information related to the content of the data, and so forth. The analysis results comprise at least one of radiofrequency (RF) data analysis, image data analysis, sound data analysis, and artificial intelligence (AI) analysis. In some instances, the analysis results may comprise results of meta-data analysis, substance analysis, and sensor data analysis. Based at least in part on the analysis results, the system may determine or assign appeal factor values to one or more parts of data. Alternatively, in some implementations, the system may, based at least in part on the analysis results, determine compression configurations and associate them to data or portions of data.

The appeal factor values or range of appeal factor values may comprise continuous values, discrete values, or a combination thereof, and the range of appeal factor values may be divided regularly or irregularly, following at least one of a logarithmic partition, gradually decreasing partition, gradually increasing partition, quantiles partition, custom partition, or any combination of these. The appeal factor values may be assigned or determined based at least in part on AI analysis, the output of AI analysis, by-product data related to the output of AI analysis, or heat maps of appeal factor values. The system may further analyze stored and/or received data and determine, based at least in part on the data, the appeal factor values. The modules further allow the system to assign the appeal factor values or a range of appeal factor values to one or more parts of data. The system may further associate compression configurations with the appeal factor values or a range of appeal factor values. The modules allow the system to compress the one or more parts of data based on the appeal factor values or a range of appeal factor values. Alternatively, the modules allow the system to compress the one or more portions of data based on the compression configurations associated with the one or more portions of data.

The association of (range of) appeal factor values with compression configurations or the association of one or more portions of data with compression configurations comprises the selection of compression algorithms, parameter values of a compression algorithm, and/or compression parameters. The compression parameters may include at least one of storage and/or transmission conditions, error conditions, and quality conditions. Storage and/or transmission criteria or conditions may include at least one of a compression ratio, a compressed data size, a compression and/or decompression time or speed, a transmission time or speed, or any other criterion related to data storage or transmission. Error criteria or conditions may include at least one of an error tolerance, a reconstruction error, a loss factor, or any other criterion related to the degree of data loss that can be tolerated. Quality criteria or conditions may include at least one of a reconstruction quality, an amount of quality conserved or lost, a loss factor, or any other criterion related to the desired result of data compression. In some instances, the association of the appeal factor values or a range of appeal factor values with compression configurations or the association of one or more portions of data with compression configurations is made autonomously. The system may further compress the one or more parts or portions of data based on the compression configurations. The compression algorithms may include algorithms based on lossless compression, near-lossless compression, lossy compression, and combinations thereof.

In some implementations, the system may further comprise an imaging sensor or an imaging device and may capture image data. The imaging sensor may comprise at least one of optical sensors, synthetic aperture radar (SAR) sensors, and area imaging sensors. The imaging device may have a plurality of pixel sensors. The image data may comprise images and/or sequences of images. The system may be configured to analyze the image data to identify at least one characteristic of interest. The characteristic of interest may be identified based at least on the type of data. For example, for image data the characteristic of interest may be identified as one or more objects or features of interest, for example pipelines or oil tanks. For RF signals the characteristic of interest may include for example a particular frequency, a bandwidth, or any other signal parameter. Based at least in part on the characteristic of interest, the system may determine (range(s) of) appeal factor values or at least one appeal factor value, or may assign (range(s) of) appeal factor values or at least one appeal factor value to the pixels of the image. The (range(s) of) appeal factor value(s) may be assigned or determined based at least in part on properties, parameters or conditions caused by, or related to at least one characteristic of interest. In some instances, the (range(s) of) appeal factor value(s) may be assigned or determined based at least in part on a database updated according to at least one of predetermined time intervals, predetermined areas, predetermined locations, pixel age, data acquisition opportunity cost, or data acquisition patterns.

The system may assign the (range(s) of) appeal factor value(s) to one or more parts of the image data. The modules may further allow the system to compress the one or more parts of the image data using one or more compression configurations associated with the (range(s) of) appeal factor value(s). Alternatively, the modules may allow the system to determine, based on the characteristic of interest, one or more compression configurations, and may compress the one or more parts of the image data using the one or more compression configurations. The modules may further allow to analyze the image data by comparing the image data with received and/or acquired data, reference data or multi-temporal imagery data sets to identify at least one change on the at least one characteristic of interest, and the association of appeal factor values with one or more parts of image data or the association of compression configurations with one or more parts of image data is based on the identified at least one change. The system may further store and/or transmit the compressed one or more part of the image data. Additionally or alternatively, the system may further comprise manned or unmanned aerial-based, space-based, ground-based or maritime-based vehicles, wherein the imaging sensor is on-board the vehicle. The manned or unmanned aerial-based or space-based vehicle may be a balloon, a drone, an aircraft, a satellite, a spacecraft, and so forth, and the imaging sensor may be a fixed or movable camera such as surveillance or web camera, robot camera, and so forth. For example, the system may be applicable to edge computing/Internet of Things (IoT) scenarios, specifically, where a connection from the sensors to the storage, data processing or users has a limited bandwidth. Examples of IoT devices may be surveillance or conference meeting cameras for detecting movement or faces, people, text in the images or specific features, and assigning compression configurations or appeal factors based on the relevance or changes of the data; or remote microphones or cameras, selectively compressing depending on the acoustic characteristics (whether there is voice, music, noise or silence) or depending on the language or accent used (the listeners may not need as much information to understand a message in their native language as compared to a non-native language or a language having a different accent).

Example of Satellite-Based System for Selective Data Compression

As illustrated in FIG. 1, a satellite-based system 100 includes a satellite 102 having one or more sensors 104 and one or more payload systems 106. The one or more sensors 104 may be any sensor that collects or generates data on board the satellite, and may include imaging sensors, instruments for Earth observation, substance detection sensors, temperature sensors (e.g., thermal imaging sensors, or infrared sensors), sun sensors, Earth sensors, power meters, attitude sensors, and the like. Some (or all) of the sensor(s) 104 may form part of a payload system 106, for example one or more imaging sensors may form part of an imaging payload system. The imaging sensors may include, but are not limited to, area imaging sensors, wide field-of view imaging sensors, narrow field-of-view imaging sensors, hyperspectral imaging sensors, multispectral imaging sensors, thermal imaging sensors, infrared imaging sensors, line sensor, push broom sensors, among others, and may be part of cameras. The imaging sensors are not limited to optical sensors, other types of imaging sensors such as SAR sensors, among others, may be used. In some instances, some components of the one or more payload systems 106 may be on-board the satellite and some components may be ground-based or on-board a separate satellite or spacecraft, with such ground-based or separate spacecraft in communication with the satellite. Also, the one or more sensors 104 may be the sensors used in typical satellite operational subsystems and modules such as the attitude and orbital control subsystem (AOCS) module, power module, and so forth.

A control system 108 may comprise one or more on board computers for handling the functions of the one or more sensors 104, payload systems 106 and other systems on board the satellite. The control system may include one or more processors 110, computer-readable media 112 and interfaces 114. The one or more processors 110 may include central processing units (CPU), graphics processing units (GPU) or both CPU and GPU, or any other sort of processing unit, such as, for example, digital signal processors (DSPs), field programmable gate arrays (FPGAs), application-specific integrated circuits (ASICs), or others, such as, artificial intelligence and machine learning accelerators. Interfaces 114, include any hardware or software arrangement for connecting the components of the satellite 102 together, and its subsystems. Computer-readable media 112 (also referred to as one or more memories) may store program instructions and program modules that are loadable and executable on one or more processors 110, as well as data generated during execution of, and/or usable in conjunction with, these programs, such as RF data, image data, images, analysis results, and so forth. Depending on the configuration and type of on-board computers used, computer-readable media 112 may include volatile memory (such as random access memory (RAM)) and/or non-volatile memory (such as read-only memory (ROM), flash memory, etc). Computer-readable media 112 may also include additional removable storage and/or non-removable storage including, but not limited to, flash memory, magnetic storage and/or optical storage, and/or tape storage that may provide non-volatile storage of computer-readable instructions, data structures, program modules, and other data. Computer-readable media 112 is an example of non-transitory computer-readable media and may store various instructions, routines, operations, and modules that, when executed, cause the processors to perform various activities. Non-transitory computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CD-ROM), digital versatile disks (DVD) or other optical storage, magnetic cassettes, magnetic tape, magnetic disk storage or other magnetic storage devices, solid state drives (SSDs) or any other tangible, physical medium which can be used to store information and which can be accessed by a computing device.

The computer-readable media 112 may store one or more modules for controlling the satellite 102 and the payload systems 106, and for other satellite tasks. In some embodiments, the control system 108 may include modules such as a data acquisition module 116 and an analysis module 118. It should be appreciated that not all modules need to be present in every embodiment, that additional modules may be present for other purposes, and that several modules may be present for one or many of the purposes described. The modules stored in the computer-readable media 112, in many instances, provide for control of other systems and hardware on board the satellite.

The data acquisition module 116 is primarily responsible for sending instructions to the hardware components of the payload systems 106 and one or more sensors 104, for capturing or collecting data. For example, the data acquisition module 116 may be configured to capture images and to perform other related imaging instructions including storing, cataloging, determining exposures, amplification gains, among other things. Alternatively or additionally, the data acquisition module 116 may be configured to detect substances, to receive/transmit RF signals, or perform any action related to the acquisition of different types of satellite data. The data acquisition module 116 may further include instructions for processing the collected data including image processing instructions for captured images, quantification instructions for detected substances, detecting or identifying RF signals, de/encoding instructions for detected signals, and so forth. In some instances, the data acquisition and the data processing may be handled by separate modules. For example, image acquisition may be handled by the data acquisition module 116 and the data processing may be part of a separate processing module configured to process data from the sensors on-board the satellite.

The analysis module 118, which in some instances may be part of a processing module, may be configured to determine from the data captured by any of the one or more sensors 104 or payload(s) 106 on-board the satellite, what information is meaningful and what is irrelevant or less relevant for a given application. For example, the analysis module 118 may include algorithms to perform actions such as object recognition, edge detection, feature recognition, cloud detection, image segmentation, among others, to the image data captured by an imaging sensor. Also, the analysis module 118 may include algorithms to extract or compute derived information for example by analyzing and looking for patterns or signals in received signals from the radio or optical communications system; or may include algorithms for substance quantification and determination based on the substance detected by a substance detection payload system.

In some instances, the satellite 102 is equipped with significant processing capabilities and the analysis module 118 may perform much of the analysis to the acquired data on board the satellite 102. Alternatively or additionally, some of the sensor data processing and/or sensor data analysis may be performed off-board the satellite, for example at a ground-based station or at another vehicle such as another satellite with data processing and analysis capabilities. The processing and analysis capabilities may be shared between multiple satellites within a constellation, or between the satellite and a ground-based station.

The satellite 102 may further comprise a selective data compression system 120. The selective data compression system 120 may selectively compress the data collected, received and/or generated by the satellite, based at least in part on data content. For example, with respect to image data, after the analysis module 118 has analyzed and detected relevant and irrelevant or less relevant features on an image, the selective data compression system 120 may determine an appeal factor or a range of appeal factors for the detected relevant and irrelevant/less relevant features. The selective data compression system 120 may further determine the compression configuration, compression algorithm or compression instructions associated with each appeal factor or range of appeal factors, in order to compress the features of the image based on the appeal factors. Alternatively, after the analysis module 118 has analyzed and detected features or objects of interest, the selective data compression system 120 may associate compression configurations with one or more portions of data in order to compress the one or more portions of the data based, at least in part, on configuration parameters such as the tolerable loss of data or acceptable compression error of the compressed data. In another example, with respect to RF signals, the analysis module 118 may determine a georeferenced heat-map of RF signals based on the analysis of RF-spectrum usage by correlating pixel by pixel the obtained RF data with a georeferenced geographical area. The selective data compression system 120 may assign an appeal factor (or a range of appeal factors) to the georeferenced pixels, and may subsequently associate the compression algorithm (s) and/or compression parameters to the appeal factor (or a range of appeal factors), in order to compress the RF signal based on the appeal factor (or a range of appeal factors) assigned to the georeferenced pixels. Alternatively, the selective data compression system 120 may associate compression configurations to the georeferenced pixels to compress the RF signal based on the analysis of RF-spectrum usage.

Figure 2:
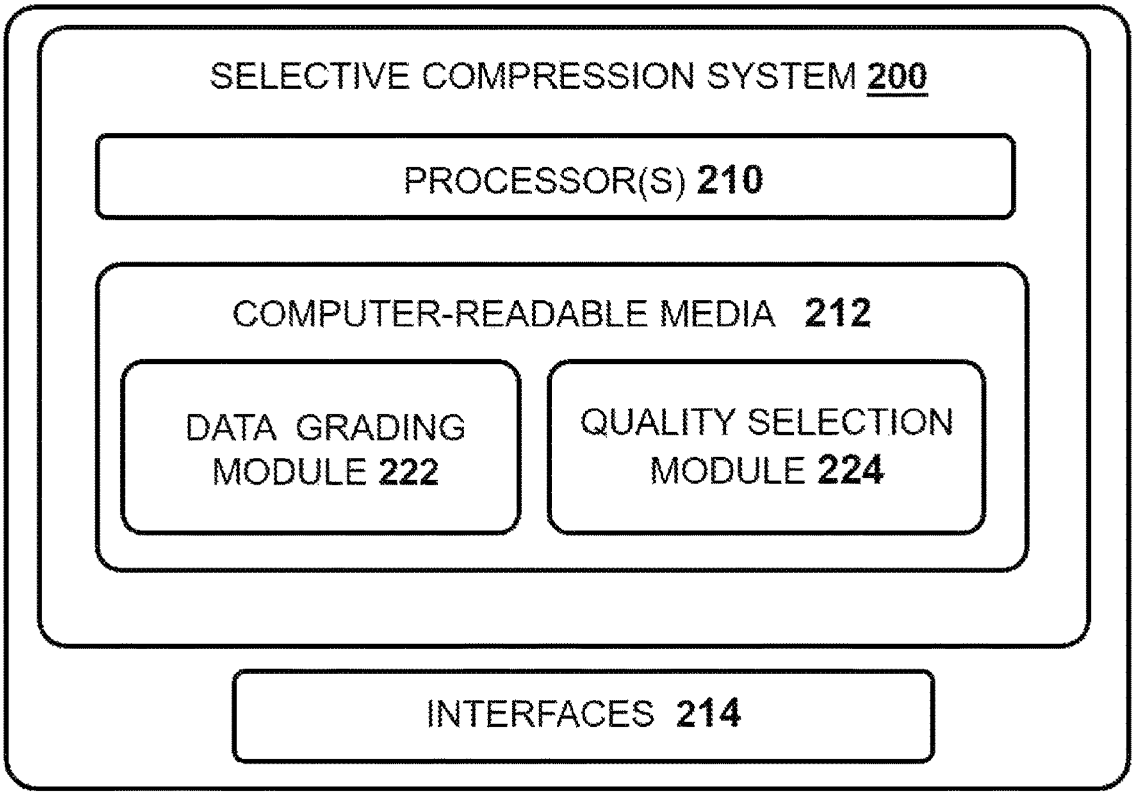
FIG. 2 is a block diagram that illustrates some modules of a selective data compression system according to embodiments of the present disclosure.

FIG. 2 is a block diagram that illustrates some of the modules that may form part of a selective data compression system 200, which may be similar to the selective data compression system 120 of FIG. 1. The selective data compression system 200 may include one or more processors 210. The processors 210 may be the same as the processors 110 of the control system, but in many instances processors 210 are dedicated to the selective data compression system 200. The processors 210 may be CPUs, GPUs, DSPs, FPGAs, ASICs, AI accelerators or any combination of these, or alternative types of suitable processors. The selective data compression system 200 may further include computer-readable media 212 that stores data, and one or more modules for controlling the selective data compression hardware and software, and interfaces 214. The data may be received by the selective data compression system 200 or may be collected by systems comprising sensors such as the satellite-based system 100. The selective data compression system 200 may selectively compress the data based on the data content, based on the application, based on contextual information, among other factors. Some of the modules stored in the computer-readable media 212 may include a data grading module 222, and a quality selection module 224. The selective data compression system 200 may be on-board a manned or unmanned aerial or space vehicle such as a satellite, a spacecraft, a balloon, a drone, an aircraft, and so forth. Additionally or alternatively, the selective data compression system 200 may be shared between multiple vehicles, or between a vehicle and a ground-based or space-based station.

The data grading module 222 is primarily responsible for determining an appeal factor or range of appeal factors and/or for assigning the appeal factor(s) to the data. In some instances, the data grading module 222 may be part of or the same as the analysis module 118, and may be configured to analyze data in order to determine either discrete or continuous values of appeal factors, and correlate or assign the appeal factor(s) with the data. For example, the data grading module 222 may be configured to determine a range of appeal factors from $AF_{max}$ to $AF_{min}$, divided in n values equally distributed within the whole range ($AF_{max}$-$AF_{min}$), wherein the value of the appeal factor, and hence the importance rate or value, gradually increases from $AF_{min}$ to $AF_{max}$. The highest appeal factor ($AF_{max}$) may be assigned to the important portions of the data, such as segments or pixels on an image data, the lowest appeal factor ($AF_{min}$) may be assigned to the unimportant portions, and intermediate values of appeal factors (between $AF_{max}$ and $AF_{min}$) may be assigned to different portions of the data having different degrees of importance. In some instances, the data grading module 222 may divide the range of appeal factors with appeal factors following a logarithmic partition, gradually decreasing partition, gradually increasing partition, in quantiles partitions such as percentiles, quartiles, deciles, and so forth, or in a custom manner, or any combination of these, for example different parts of the range may have different divisions, and so forth.

In order to determine the importance rate or value of the data, the data grading module 222 may include algorithms configured to analyze the data. For example, in relation to image data, the data grading module 222 may perform image or 3D segmentation, labeling, object recognition, or other algorithms in relation to image data. This could be the case, for example, of one or more images captured of a city surrounded by mountains within a geographical region where the data grading module 222 may run algorithms to detect objects or features of interest such as rivers, houses and roads on each image. The data grading module 222 may further assign to those classes a maximum appeal factor and may assign lower appeal factors to the remaining classes or pixels of the image. In some instances, the data grading module 222 may analyze data to determine the importance rate or value of the data using executable code uploaded or transmitted to the satellite 102 of the satellite-based system 100. The executable code may be in the form of binary code comprised of native instructions, or source code to be compiled into native instructions on board the satellite, or it may be in any suitable scripting language, such as, for example, Python, Java, Smalltalk, Go, or any other suitable programming language capable of being executed by processors 210 or processors 110 on board the satellite 102. The executable code may include data acquisition instructions, data processing instructions, data analysis instructions, and/or configuration settings. The data grading module 222 may select the algorithm or executable code to analyze one or more parts of data and/or determine, based at least in part on the analysis results, at least one appeal factor value or at least one range of appeal factor values. The data grading module 222 may select to use algorithm(s) and/or executable code(s) received from the ground after the satellite was launched, may select to use algorithm(s) and/or executable code(s) resident on the satellite which had been stored before launch, or may select to use a combination of both. For example, the data grading module 222 may select specific algorithms based on the data or its relevance, or based on particular compression parameters for existing compression algorithms (such as a JPG configuration or Huffman table).

The data grading module 222 may be further configured to assign the appeal factors based on some properties, parameters or conditions caused by, or related to the detected objects or features of interest. For example, the assignment of appeal factors to the pixels or portions of the image comprising content data other than the objects/features of interest may be related to the distance of these to the objects/features of interest, such that the rivers, houses and roads on each image may be assigned $AF_{max}$ and, as each pixel or group of pixels of the image distances away from the objects/features of interest, the data grading module 222 may assign uniformly decreasing values of appeal factors which decrease gradually from $AF_{max}$ to $AF_{min}$ in relation to the distance to the objects/features of interest. In some implementations, the data grading module 222 may be further configured to assign appeal factors based on some properties or parameters of the sensors acquiring or collecting data. For example, a satellite may capture images using a multispectral or hyperspectral filter and a different appeal factor or a range of appeal factors may be assigned to each of the bands or group of bands present on the images e.g. $AF_1$ the red band, $AF_2$ the green band, $AF_3$ the blue band, $AF_4$ the near-infrared band and $AF_5$ the short-wave infrared band; from $AF_1$ to $AF_5$ the visible range (0.4 to 0.7 μm), from $AF_6$ to $AF_8$ the near-infrared range (NIR; 0.7 to 1 μm), from $AF_9$ to $AF_{22}$ the mid-wave infrared (MWIR; 3.5 to 5 μm), and from $AF_{13}$ to $AF_{20}$ long-wave infrared range, and combinations thereof.

In relation to satellite applications, the data grading module 222 may assign appeal factors based on instructions received from the ground or another satellite, or based on decisions made onboard by the satellite. For instance, a SAR satellite may be tasked to obtain information about the trees in a forest located in a geographical region of interest on the surface of the Earth, and to transmit this information optimizing the size of the transmitted information. Thus, for a given 3D landscape reconstruction, the data grading module 222 may be configured to segment the 3D landscape reconstruction into important portions (e.g. comprising the forest within the geographical region of interest) and unimportant portions (e.g. comprising the geographical region other than the forest of interest but also collected due to extent of the field-of-view of the SAR sensor). Based on the segmentation of the 3D landscape reconstruction, the data grading module 222 may assign different appeal factors to the important and unimportant portions. Alternatively or additionally, the data grading module 222 may calculate parameters associated with part or the whole area captured by the SAR sensor and may assign the appeal factors based on the parameter (e.g. height of the trees, health of crops, level of the rivers, and so forth). Also, in some instances, the appeal factors may be assigned based on frequencies, or trigger conditions (e.g. only assign an appeal factor if a certain parameter exceeds a threshold, such as if the height of the trees is above a predetermined threshold).

In some instances, the data grading module 222 may dynamically update a database to determine or assign the appeal factor values. For example, a satellite may have a database comprising a map (chart, layout) which correlates (range(s) of) appeal factor values to corresponding portions of image data of a geographical area or region on the surface of the object or planet (e.g. the Earth). The data grading module 222 may not always use the same appeal factor values for the same geographical area or region on the surface of the planet. The selective data compression system 200 may, according to predetermined or preselected times or time intervals, areas or locations, store the collected data of the geographical area or region without applying any compression and/or loss factor, so that the data grading module 222 may update the database of appeal factor values corresponding to the delimited region based on image data without being lost by any compression technique. In cases where the database is updated on the ground, the selective data compression system 200 may (store and) transmit the collected data to the ground without being compressed and the data grading module 222 may update the database and subsequently send the updated database to the satellite. In some instances, the selective data compression system 200 may select areas within the delimited geographical area in order to vary which areas to collect, store and/or download image data without applying any compression and/or loss factor, so that the data grading module 222 may have data without being compressed (e.g. high resolution images) in order to update the database of appeal factors for the complete delimited geographical area. The areas may be selected based on the pixel age (i.e. the length of time that the pixel has existed), the data acquisition opportunity cost, data acquisition patterns (e.g. sweeping the delimited geographical area in order to acquire uncompressed data gradually covering the delimited geographical area from one area to another of the delimited geographical area, or from one time to another), and so forth.

The data grading module 222 may assign appeal factors based on contextual information of the data. As used herein, contextual information refers to any information related directly or indirectly with the data to be compressed. For example, in instances where the data comprises images taken from a satellite, the contextual information may be the geolocation of the satellite, the time of the day or year when the image was collected, the satellite telemetry, and so forth. The data grading module 222 may assign appeal factors based on information determined from the data. For example, after analyzing image data the appeal factor may be assigned by color or range of colors such that the portions of the image having a color or range of colors more similar to a preselected color may be assigned a predetermined appeal factor (e.g. appeal factors associated with a higher resolution and hence less compression or loss factor). Similarly, after analyzing RF signals, appeal factor values associated with compression configurations providing higher resolution may be assigned to higher frequency bands.

The data grading module 222 may use an artificial intelligence (AI) processing module for determining the importance or hierarchy of the data, usually in connection with a given application or use. The AI processing module may be a form of neural network (NN) and/or may be capable of training NNs through supervised learning (SL), unsupervised learning (UL) or reinforced learning (RL), to perceive, encode, predict, and classify patterns or pattern sequences in the captured image data, and achieve human-level, and in many instances, superhuman level proficiency at image segmentation, image labeling, object recognition, detection of salient features and automated image analysis. The data grading module 222 may use the output of the AI processing module to directly assign appeal factor values to the whole or portions of data. In some instances, the AI processing module may be a module used for image processing to obtain information from each pixel in relation to a particular application and the data grading module 222 may extract, as a by-product data, how much information the AI processing module obtained from each pixel. Accordingly, the data grading module 222 may determine which pixels provided more information and were more important and which pixels provided less information and were less important in relation to the particular application, and may accordingly assign values of appeal factors.

In a particular non-limiting implementation, Convolutional Neural Networks (CNN) are instanced in a CPU or GPU or an FPGA or AI accelerator onboard a satellite in orbit, and used to process images captured with a high-resolution camera, in real-time, and produce vector maps containing object shapes and object labels present in the original image data. The object shapes and object labels may correspond to a wide variety of human-made and naturally occurring objects (such as buildings, cars, roads, rivers, trees, agricultural fields, etc.). Based on the information used or provided by the CNN, the data grading module 222 may determine a heat map of appeal factor values showing the importance of the pixels of the captured image which may be used by the quality selection module 224. For example, a NN may be trained to classify and/or assign classes to objects of interest such as trees, cars, plants, and so forth, and by determining which pixels provided more useful information for establishing the classification, the data grading module 222 may determine a heat map containing the grade of interest of the classes within the image (i.e. a heat map of appeal factor values).

The NNs may be trained Earth-side and then instantiated on satellites in flight, and/or the NN training may be ongoing on-board the satellite during its operational lifecycle. The AI processing module may take advantage of general computation hardware, like CPUs, or GPUs, digital signal processors, AI accelerators or on ad-hoc hardware architectures implemented in field programmable gate arrays ("FPGAs") or application-specific integrated circuits ("ASICs") or other hardware embeddings, to be applied to images, or image sequences taken by the imaging sensors of the satellite, and used, in-orbit, as general building blocks as part of the compression pipeline, configured to provide directly or indirectly information of the importance or usefulness of each of the pixels or portions of the images for a given application, without requiring downlink to a ground station or further processing outside the satellite platform. Additionally or alternatively, the output of the AI processing module may be used as general building blocks as part of an image processing pipeline, or an image analysis workflow, configured to catalog, transform, and analyze images and image collections both in real-time and on batch-processes, and provide, as by-product information, how much information or relevance is supplied by the pixels or portions of the captured images.

The relevance of the data and/or the captured images may be downloaded (compressed or uncompressed) to the ground and may be stored in a training platform, where they can be used to build training sets and to train machine learning algorithms, such as, for example, convolutional neural networks, deep belief networks, deep learning neural networks, and other suitable machine learning algorithms, to do data-oriented compression. For example, a training set may comprise an image and the relevance or importance of each pixel of the image (usually in connection with an application or use) and the output of the NN may be the importance of each pixel. Once the algorithms are trained, the trained instances can be uploaded and run in orbit on the satellites, and become available as tools to be applied in orbit. In satellites having significant processing capabilities, the generation of training sets, the training and/or the re-training or update of NNs may be performed while the satellites are in-orbit.

The quality selection module 224 is primarily responsible for determining the level or degree of compression based at least in part on the values of appeal factors. The quality selection module 224 may determine degrees or levels of compression by determining different compression configurations comprising compression parameters, compression algorithms, parameter values of a compression algorithm, and/or compression loss factors, and associating, relating and/or assigning the compression configurations with the appeal factor values or ranges of appeal factor values. In some instances, the compression configurations may be directly mapped to appeal factor values or ranges of appeal factor values by matching or associating each appeal factor to one compression configuration. For example, a table of values of appeal factors may associate each value or range of values with a compression configuration comprising at least one of a compression algorithm, a loss factor, a compression parameter, and so forth. In some instances, the compression configurations may be directly associated to portions of data or all the data, without having the explicit intermediate step of determining or assigning one or more appeal factors to portions of data or all the data. The compression algorithms can be of any type and may be selected depending on the application or task to be performed by the satellite, on the data content, on the transmission bandwidth parameters, and so forth. The compression algorithms may include algorithms based on lossless compression techniques, near-lossless compression techniques, lossy compression techniques, artificial intelligence, and combinations thereof. In some instances, the quality selection module 224 may determine to discard one more more portions of the data. For example, based on an analysis using artificial intelligence (AI) or machine learning, such as based on the analysis performed by the AI processing module of the data grading module 222, the importance of the data and its portions can be determined, and based on that it can be determined that certain portions of the data are to be discarded, and if so, it can be determined which portions of the data are to be discarded. In the case of images, a set of pixels or even each pixel of the image may be assigned a different compression configuration (e.g. a compression algorithm). In some implementations, the quality selection module 224 is responsible for associating compression configurations to one or more portions of data, based on analysis of the data, including segmentation, labeling, object recognition; properties, parameters or conditions caused by, or related to detected objects or features of interest; properties or parameters of the sensors acquiring or collecting data; stored or received instructions; databases or heatmaps; pixel age, data acquisition opportunity cost, data acquisition patterns; contextual information; as explained throughout the Detailed Description.

In some implementations, the appeal factor values or one or more portions of data may be associated with compression algorithms based on transform functions in which the degree of loss is related to the characteristics of the quantization step and/or the entropy coding. The compression algorithms may comprise transforming the data from one domain into a different domain, quantizing the transformed data, and coding the resulting quantized values. For example, image data may be transformed using mathematical operations including sine transforms, cosine transforms, wavelet transforms, Fourier transforms, or other known mathematical transformation functions, may be subsequently quantized and then coded using entropy coding such as Huffman coding. The quantization may be linear or nonlinear, may be performed at one or more resolution levels and may be determined based on the appeal factor values associated with the data. For example, the satellite may collect an image, analyze it to obtain analysis results, and based on the analysis results the satellite may assign appeal factor values to all or parts of the image. Based on the appeal factor values, the satellite may assign different quatizations for the different resolution levels, and additionally, it may code the quantized data using Huffman tables coded based on the appeal factor values.

In some instances, the compression algorithms may be based on wavelet transformation functions to compress an image or parts of an image (sub-images) having different levels of resolution along the horizontal, vertical or diagonal directions. This is useful for example in satellite applications since the satellite may determine the amount of information, i.e. the level resolution of the compressed image, to either analyze on-board the satellite or transmit to a ground station or another satellite. For example, a satellite may capture an image of an area of the ocean and may, based on a heat map indicating the areas of the ocean having requests to monitor ships, assign appeal factor values to the different parts of the image or assign compression algorithms to the different areas on the image. The compression algorithms (associated or not with appeal factor values) may be based on wavelet transformation functions such that the different parts of the image may be compressed having different layers or levels of resolution (e.g., four levels), starting from a lower resolution level at different directions (LL0, LH0, HL0, HH0, wherein LL: Low-Low, HH: High-High, HL: High-Low and LH: Low-High), up to higher resolution levels (e.g. LL3, LH3, HL3, HH3). The satellite may store the compressed sub-images and may subsequently select to decompress only the sub-images representing the relevant areas associated with client requests with a predetermined level of resolution (e.g. LL0, LL1), in order to analyze the decompressed sub-images on-board the satellite to identify or detect ships. If the level of resolution is insufficient to identify or detect ships, the satellite may subsequently decompress further layers of resolution (e.g. LL2 and/or LL3) to be able to identify or detect ships. Also, the satellite may select which layers of resolution of the compressed images or sub-images to transmit to a ground station or to another satellite taking into account the bandwidth, gradually adding higher levels of resolution.

Compression algorithms based on wavelet transformation functions are also useful for real-time compression. In some instances, the satellite may compress in real-time the collected image generating different resolution levels and may further compress the data based on appeal factors. For example, a satellite may increase the transmission speed between the sensors and processors by compressing the image data by lines (rows or columns) instead of by blocks of data using a compression algorithm based on wavelets, since operating by lines reduces the computational time and complexity spent on processing the data, as it allows to start processing data when a line is received from the sensor, and not having to wait until larger blocks of data are received. The satellite may subsequently select the level of resolution of the compressed image to analyze and assign appeal factor values, so that different parts of the compressed image with the selected level of resolution may be compressed with compression algorithms associated with the appeal factor values, to be stored in the satellite or transmitted to a ground station or another satellite. For another example, the image data may be compressed using a compression algorithm based on wavelets in real time, providing different appeal factors for the different levels of resolution, and the appeal factors may be then used to select the level or resolution from the already compressed data. In this situation, the compression step happens before assigning the appeal factors, and this allows to apply the compression in a virtual or physical processor, and the calculation of the appeal factor can be decoupled and performed in another virtual or physical processor with more processing power or less constraints, which makes the calculation easier.

The quality selection module 224 may select among different techniques the most suitable method to match, associate or link the value of appeal factors with the compression settings (configurations) or to associate the compression configurations with one or more portions of data, depending on the type of data, the computing resources, the data content, and so forth. For examples comprising image data, the quality selection module 224 may use masks for assigning the compression parameters or algorithms, as illustrated in the following example. After one or more appeal factors are determined for an image or assigned to the pixels of an image, the quality selection module 224 may generate a mask for each appeal factor value or a range of appeal factor values and may associate the mask with a compression configuration comprising a compression algorithm, so that the selective data compression system 200 may multiply the image by each of the masks and may compress each of the resulting multiplied images with the compression algorithm associated with its corresponding mask, in order to transmit and/or store the set of compressed multiplied images. In some instances, instead of generating masks for the appeal factor values, the quality selection module 224 may generate one or more masks for the portions of the image that have been identified as features or objects of interest, for portions identified as obstructions like dust or clouds, and for unidentified portions of the image. The quality selection module 224 may subsequently associate at least one appeal factor value with each of the masks (or a group of masks), so that after multiplying the image with the masks, the compression system may compress each multiplied image differently, based on the compression configuration associated with the appeal factor assigned to the mask (or group of masks), in order to transmit and/or store the compressed multiplied images. Alternatively, the quality selection module 224 may associate at least one compression configuration with each of the masks (or a group of masks), so that after multiplying the image with the masks, the compression system may compress each multiplied image differently, based on the compression configuration associated with the masks (or group of masks). In some instances, the masks may be applied to zero all data outside each of the masks.

Given that compressing small amounts of data requires less computing resources than compressing large amounts of data, alternatively or additionally, the quality selection module 224 may divide the data in blocks, portions or pieces and subsequently, the selective data compression system 200 may compress each block (portion, piece of data) using a compression configuration associated with each block, portion or piece. If one or more appeal factor values are assigned to the data, the appeal factor values may be used as reference for block division, so that the data may be divided into regular or irregular shaped blocks having the same or different sizes in accordance with the appeal factor value assigned to the data. For instance, in examples in which the data is image data, the image data may be divided into blocks of data such that pixels or portions of the image having sudden or abrupt change in appeal factor values are grouped in small blocks and pixels or portions having gradual or low change in appeal factor values are grouped into big blocks. In another example, each pixel of the image may have associated an appeal factor value and the quality selection module 224 may identify the pixels having a predetermined value of appeal factor (e.g. maximum, minimum, and so forth) and may divide the image in portions wherein the pixel having the predetermined value is the center of the portion and the extent of the portion is determined by a predetermined extension amount. For instance, the image may be divided in N portions, wherein each portion has a pixel at its center with a value $AF_{max}$ and the size of the portion may be X pixels away from the pixel at the center. Additionally or alternatively, the size of the blocks may be based on other compression parameters such as the transmission speed, the storage capacity, the degree of data loss that can be tolerated, and so forth. In other instances in which data is not image data, the blocks may be portions comprising some parts of the data and not other parts.

In some instances, the quality selection module 224 may, additionally or alternatively, determine a value of appeal factor for each block (a block appeal factor value), portion or piece of data, and may assign/associate the value of appeal factor determined for each block to/with a compression configuration, so that the selective data compression system 200 may compress each block of data using the compression configuration associated with the appeal factor determined for each block of data. For example, an image may be divided into tiles or blocks comprising one or more pixels. The blocks may have a predetermined size, and the image may be divided forming a uniform grid of one or more blocks of N×M, wherein N and M are integer numbers (in some instances M may be equal to N). The quality selection module 224 may determine an appeal factor value for each block. In instances in which the pixels of the image have associated an appeal factor value, the appeal factor value for each block may be determined (a block appeal factor value), for example, by determining the maximum appeal factor value of all the appeal factor values associated with the pixels within the block and establishing the determined maximum value as the appeal factor value of the block. It should be understood that the value determined for each block may be the value, or any other value that may be calculated from the appeal factor values associated with the pixels included in each block. The quality selection module 224 may further associate compression configurations or algorithms with the appeal factors of the blocks, for example assigning compression algorithms comprising lossless compression schemes for the higher values of appeal factors and compression algorithms comprising lossy schemes for the lower values of appeal factors. The selective data compression system 200 may compress the data of each block using the compression algorithm assigned to the appeal factor determined for that block.

Additionally or alternatively, the quality selection module 224 may determine contour lines for values of appeal factors. As used herein, contour lines refer to portions or regions of data grouped based on threshold conditions, like the lines drawn on a map where the points are grouped based on elevation thresholds and each contour line connects points of equal elevation. The data may be grouped based on the appeal factor values such that each group is delimited by predetermined threshold values and the appeal factors within each contour line have the same, similar or related values. For example, for an image having different values of appeal factors assigned to each pixel or set of pixels, several contour lines may be determined so that each contour line comprises a group of pixels having appeal factor values within, below and/or above predetermined threshold values. The quality selection module 224 may determine a contour line for pixels having (associated with) an appeal factor value below threshold value $T_1$, another contour line for pixels having appeal factor values above threshold value $T_2$, and another contour line for pixels having appeal factor values within the threshold values $T_1$ and $T_2$. The quality selection module 224 may assign compression settings (configurations) to each contour line so that the selective data compression system 200 may compress the pixels included in each contour line using the compression algorithm assigned to each contour line. In some instances, the quality selection module 224 may determine an appeal factor value for each contour line based on the appeal factor values of the pixels within each contour line, so that the compression system may compress the data of each contour line differently, based on the compression configuration associated with the appeal factor value assigned to the contour line, in order to transmit and/or store the compressed data. In some implementations, the quality selection module 224 may, based on data analysis, associate compression configurations with contour lines, so that the compression system may compress the data of each contour line based on the compression configuration associated with it.

Additionally or alternatively, the determined contour lines may be further partitioned or divided in blocks having the same or different sizes, and an appeal factor value for each block may be determined based on the appeal factors included in each block (e.g. maximum, minimum, mean, average, and so forth). As explained above, the quality selection module 224 may further associate a compression configuration (e.g. a compression algorithm) with the determined appeal factor value for each block, so that the data of each block comprising each contour line may be compressed using the compression configuration assigned to the appeal factor determined for that block. The compression configuration may be a compression algorithm of any type and may be selected depending on several factors, for example based on the data content, the transmission parameters, the power available for computing, and so forth. For instance, in cases where the compressed data is going to be transmitted from a satellite to a ground station, the compression algorithms used to compress the data may be selected based on the amount of transmitted data, so that the amount of data transmitted by the satellite (per unit time or per transmission) does not exceed predetermined limits, or may be selected so that the average data stream transmitted by the satellite is constant, and so forth. In some instances, the contour lines may be used to generate the masks, but in other instances the contour lines may be used instead of the masks to reduce the complexity. It should be understood that FIG. 2 is described by way of example showing specific entities performing specific functions, but other examples with other entities, or examples in which the features are performed by different entities, are also envisaged in the present disclosure, as is evident for the skilled person.

The selective data compression system 200 may combine several of the techniques described above. In some instances, the combination of techniques may be useful to compress images having a lower density or proportion of pixels having high appeal factor, such as when an image of a countryside contains few objects of interest such as cars on a road, agricultural machines, roads on the fields, and so forth. For example, the selective data compression system 200 may determine a threshold value so that the pixels having appeal factor values (equal to or) below the predetermined threshold value are compressed with a preselected compression algorithm (e.g. a near-lossless compression algorithm or a lossy compression algorithm) and may be subsequently transmitted and/or stored, and the pixels having appeal factor values (equal to or) above the predetermined threshold value may be assigned contour lines and/or masks and compressed using the compression algorithms associated with the contour lines and/or masks (e.g. lossless compression algorithms or lossy compression algorithms having different degrees of loss factors). Additionally or alternatively, the image or the contour lines and/or masks may be divided into blocks and compressed according to the compression configurations assigned to each of the blocks. The compression configurations may be assigned to each of the blocks based on the appeal factor values, on the image content, on the predetermined amount of data transmitted or stored, and so forth. For example, a previously defined table may correlate the compression configurations (e.g. compression algorithms, compression parameters, and so forth) with the (ranges of) appeal factor values. In some instances, the compression settings (configurations) may be dynamically determined. For example, a range of appeal factors below $AF_0$ may be assigned a compression setting comprising a lossy compression factor, the range of appeal factors above $AF_1$ may be assigned a compression setting comprising a lossless compression factor, and the range from $AF_0$ and $AF_1$ (including $AF_0$ and $AF_1$) may be assigned a compression setting having a loss factor calculated dynamically based on the available computing resources (e.g. power on a satellite), on amount of data to be transmitted or stored on the basis of the final size of the image, on the transmission rate, or on any other parameter related to the transmission or storage of the compressed data.

The selective data compression system 200 may compress data by generating a set of encoded data, wherein each unit of encoded data may have the same or a different degree of compression and/or loss factor in relation to another unit of encoded data of the set of encoded data. For example, a satellite may have (stored or received) one or more maps of appeal factor values with information about the relevance of RF-spectrum usage in a predetermined geographical area and/or for a predetermined application. The appeal factor values of the maps are associated with compression configurations determining the degree of compression and/or loss factor. When the satellite captures images and recognizes that it is above the predetermined geographical area, the satellite may, based on a first map of appeal factor values related to a particular application, assign an appeal factor value to the RF signals received from the predetermined geographical area, so that the selective data compression system 200 may compress the received RF signals, based on the first map of appeal factor values and their associated compression configurations. The selective data compression system 200 may use a second map of appeal factor values for the same geographical area but determined based on a different application than the first map of appeal factor values, and may compress the received RF signals with the compression configurations associated to the appeal factor values of the second map, and so forth. Hence, the selective data compression system 200 may generate a set of encoded data for RF signals received from the same geographical region, compressed based on different maps of appeal factor values.

In some instances, the selective data compression system 200 may compress data with assigned appeal factor values, based on cumulative differences, such as on differential compression. For example, the selective data compression system 200 may assign appeal factor values to an acquired image based on a map of appeal factor values, wherein some or all of the appeal factor values of the map may be associated with a compression configuration comprising a lossy compression algorithm with a predetermined degree of loss. The selective data compression system 200 may compress the captured image, based on the appeal factor values assigned to the image, by generating a set of compressed files. The set of compressed files may include the compressed source image (captured image), and the compressed differences or losses accumulated throughout the process of generating the compressed files using lossy compression algorithms associated with the appeal factor values. In some implementations, the selective data compression system 200 may generate a set of encoded data to compress data in an accumulative manner, by compressing the data and the loss accumulated throughout the compression process using more than one map of appeal factor values, wherein each of the appeal factor values (or a range of the appeal factor values) of the maps may be associated with compression configurations comprising a lossy compression algorithm. For example, the selective data compression system 200 of a satellite, which has assigned appeal factor values to an acquired image, based for example on one or more maps of appeal factor values associated with compression configurations comprising lossy compression algorithms with a degree of loss L, may generate a set of compressed files from an uncompressed source image (acquired image) by cumulative compression of the image and its losses, as illustrated in FIGS. 3A and 3B.

Figure 3A:
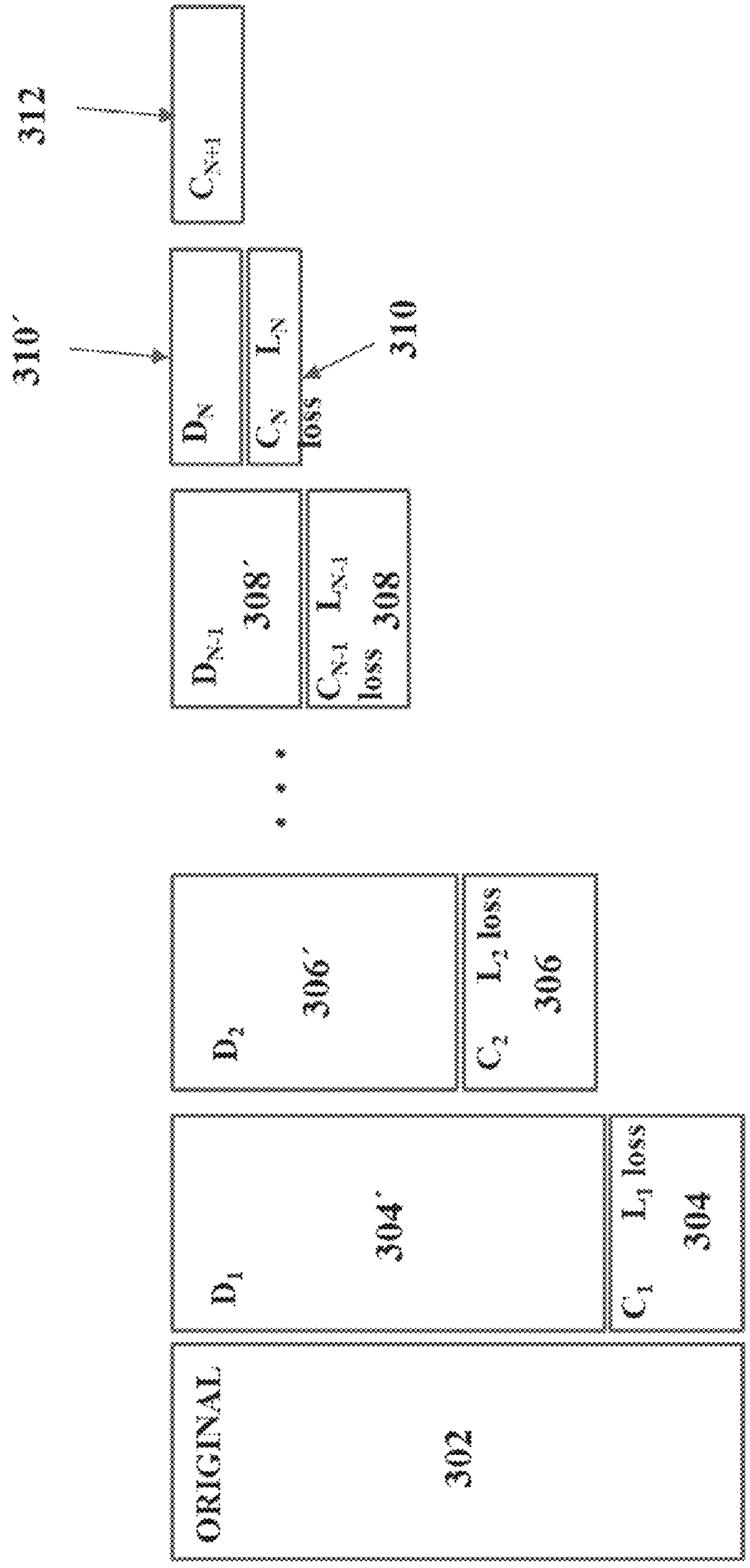
FIGS. 3A and 3B illustrate the process of compressing a source image or sub-images in a cumulative manner according to embodiments of the present disclosure.
Figure 3B:
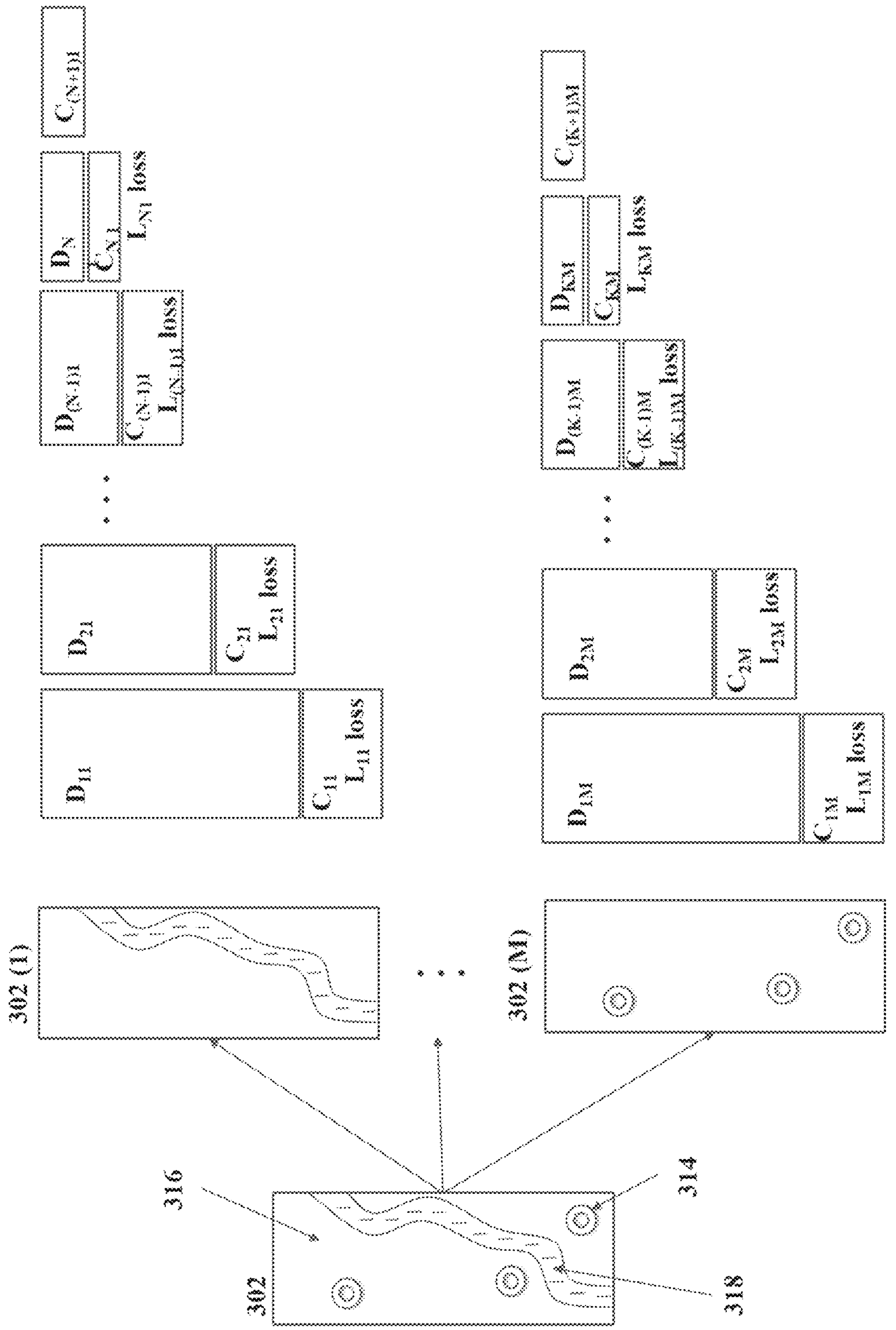

FIG. 3A shows the cumulative process by which the original image 302 captured by the satellite may be compressed. The compression configurations that may be used in the compression process described below are determined based on one or more maps of appeal factor values, since the compression configurations are associated with the appeal factor values assigned to different portions of the image. Alternatively, the compression configurations used in the process below may be compression configurations associated with one or more portions of the image assigned based at least in part on data analysis. The original image 302 may be compressed by generating a set of compressed files comprising the compressed image $C_1$ 304 and the compressed differences or compressed losses $C_2$ to $C_{N+1}$ (306 to 312), so that the satellite may subsequently select which files of the compressed set of files to store and/or transmit. The compressed image $C_1$ 304 may be the result of compressing the original image 302, using for example a compression configuration comprising a lossy compression algorithm encoding the image with a certain degree of loss $L_1$, so that the difference (or loss) $D_1$ 304' represents the information that was lost because of compressing the original image with a compression configuration with a certain degree of loss, $L_1$. In other words, $D_1$ 304' is the difference between the original image 302 and the compressed image $C_1$ 304 reconstructed after being compressed. The compressed difference $C_2$ 306 may be the result of compressing the difference $D_1$ 304' using the same or a different compression configuration, for example one comprising a lossy compression algorithm with a degree of loss $L_2$, which may be different than $L_1$, so that the difference $D_2$ 306' is the difference between the compressed difference $C_2$ 306 reconstructed after being compressed and the difference $D_1$ 304'. Similarly, in a cumulative manner, the compressed difference $C_N$ 310 may be the result of compressing the difference $D_{N-1}$ 308' using the same or a different compression configuration with a degree of loss $L_N$, so that the difference $D_N$ 310' is the difference between the difference $D_{N-1}$ 308' and the compressed difference $C_N$ 310 reconstructed after being compressed. The compressed difference $C_{N+1}$ 312 completing the set of compressed files comprises the compressed difference $C_{N+1}$ 312 encoded or compressed with a compression configuration which may comprise a lossless compression algorithm. In each iteration, the compressed difference comprises less information than in previous iterations, because part of the information in each difference D will become part of a subsequent compressed difference C. For this reason, at the final step of the iteration, the compression can potentially be lossless as there is no more information lost in the compression. In some instances, a first map of appeal factor values is used to assign appeal factor values to the pixels or portions of the source image, and the same or different maps of appeal factor values may be used to assign appeal factor values to the differences produced while generating the compressed files. Given that the appeal factor values are associated with the compression configurations, the same or a different compression configuration may be used to compress each compressed file of the set of compressed files to determine its degree of compression or loss factor. Additionally or alternatively, if the compression configuration comprises a degree of loss L, some or all of $L_1$ to $L_N$ may be the same or may be different from each other. By compressing in this manner, the satellite may select and transmit a subset of compressed files of the set of compressed images and differences $C_1$ to $C_{N+1}$, so that a decision on the degree of compression or loss may be made a posteriori, even after transmission, and not necessarily as soon as the image is captured. The overall degree of loss or compression of the original image may be determined based on the appeal factor values, by the selection of compression configurations for each of the compressed files compressing the cumulative differences or the selection of the degree of loss L, and/or by the number of compressed files comprising a subset of compressed files, so that the whole set of compressed files completes or is equivalent to the information provided by the uncompressed source image, without any loss. Alternatively or additionally, the selective data compression system 200 may generate sets of encoded data for portions or pieces of data comprising the source data, compressing the encoded data of the set in a cumulative manner. In some instances, one set of encoded data may be generated for each portion or piece of data comprising the source data. For example, a satellite may compress a previously acquired or stored image (source image) by generating, for each sub-image comprising the source image, a set of compressed files. The selective data compression system 200 may assign the same or different compression configurations to the different sub-images, in some instances based on maps of appeal factor values. Alternatively or additionally, each sub-image may be compressed generating a set of compressed files wherein each compressed file of the set of compressed files may be compressed with a different compression configuration, in some instances based on different maps of appeal factor values.

Alternatively or additionally, the compression configurations for the generated compressed files (comprising differences, images and/or sub-images) may be assigned based on content, as described in previous examples throughout the Detailed Description. For example, as shown in FIG. 3B, a satellite may acquire an image 302 of a countryside having oil tanks 314, land 316 and routes 318. The source image 302 may be divided and/or segmented in M sub-images 302(1) to 302(M), in some instances based on appeal factors assigned to the features or objects of interest, deciding what parts of a grid to assign to each sub-image, or defining a mask to separate the segments. The satellite may generate M sets of compressed files, each set corresponding to a sub-image. Each set of compressed files may be generated in a cumulative manner as described in FIG. 3A. The M sets of compressed files may have the same or a different number of compressed files (i.e. N and K are integer numbers which may be the same or different). Similarly, the sets of compressed files may have the same or a different degree of loss (i.e. $L_{11}$, $L_{21}$, $L_{N1}$, $L_{1M}$, $L_{2M}$, $L_{KM}$, and so forth, some or all may be the same or different). The satellite may subsequently decide a) which sets of compressed files, and/or b) how many compressed files of each set, to transmit to the ground or to another satellite, based on at least one of the application, the cumulative degree of loss, a request from the ground, satellite applications, satellite instructions, telemetry, appeal factors, and so forth. For example, based on the application, the satellite may decide to transmit the sets of compressed files which assigned higher appeal factors (lower compression ratio and/or loss factor) to areas of the image having routes (sub-images) and lower appeal factors (higher compression ratio and/or loss factor) to areas of the image having oil tanks and land (sub-images), or may decide to transmit a set of compressed files which assigned higher appeal factors to areas of the image having oil tanks and lower appeal factors to areas of the image having routes and land, or any combination of these. In addition, the satellite may choose how many of the compressed files of each set may be transmitted.

Similarly, the set of compressed files may be generated by adding or combining, in each step of the process the compressed files $C_1$ to $C_N$ reconstructed after being compressed with a lossy algorithm to obtain an image with loss, so that $D_N$ would be the difference between the source image and the combination of $C_1$ to $C_N$, and the process may be followed as described in any of the examples above.

Embodiments include a satellite system, comprising one or more sensors, one or more processors, and a memory coupled to the processors, the memory including one or more modules that are executable by the processors to collect, by the one or more sensors, data. The data may include RF data, image data, or any type of data that may be collected by a satellite sensor. The data may also include meta-data including contextual information such as the time the data was collected, the health of the system, the temperature of the system, data from additional sensors, and so forth. The modules may allow the satellite to analyze the data to create analysis results. The analysis results may comprise results of at least one of RF data analysis, image data analysis, AI analysis, meta-data analysis, substance analysis and sensor data analysis. The analysis may include sensor data analysis according to the type of data collected/received/stored, and/or or meta-data analysis according to the type of telemetry/operational data that is used for monitoring status/health of the satellite system. For example, the analysis may include RF data analysis comprising time/frequency/amplitude/phase information extraction, determination of signal parameters such as characteristics, modulation, frequency, bandwidth, synchronization patterns, or any other analysis involving RF signals that may be useful for selection of signals of interest, spectrum heat-map generation, time spectrogram creation, signal geolocation, signal identification, and other RF analytics. The analysis may further include image data analysis comprising at least one of feature recognition, edge detection, object detection, image segmentation, object identification, obstruction detection, cloud detection, and other such analytical tasks. Other image data analysis techniques may be used to analyze the image frame such as edge matching, gradient matching, interpretation trees, and pose clustering, to name a few, to isolate objects depicted within the image frame. The analysis may further include artificial intelligence analysis, such as by using neural networks to extract meaningful data from the data that may be useful for a particular application or task for the satellite to complete. The analysis workflow may be performed all or partially on-board the satellite. In some instances, the analysis workflow may be partially shared between multiple satellites within a constellation, or between a satellite and a ground-based station. In some cases, the analysis includes instructions uploaded to the satellite. The instructions may be uploaded as executable code and may include at least one of data acquisition instructions, data processing instructions, data analysis instructions, or configuration settings. Once the executable code, instructions or configuration settings are received by the satellite, they may be saved for later execution, and the satellite (or a user of the satellite) may select which one to use for analyzing data to obtain analysis results and/or to determine or assign, generally based at least in part on the analysis results, at least one appeal factor value or at least one range of appeal factor values or compression configurations to one or more portions of data. The instructions, uploaded or not, may be provided or developed by a user of the satellite or a third party offering analysis instructions for anybody to buy and/or use. In addition, analysis instructions may be specific to a particular task that the satellite has been tasked to complete (i.e. an application). In some cases, the satellite may be configured to transmit information related to the analysis results in real time to another satellite, a ground station, or any other receiver, so that time-sensitive information such as alerts can be transmitted as soon as possible after being obtained. This may be useful in scenarios in which for example an alert is generated when fire is detected in a specific place, or any other unusual activity, which may allow measures to be taken as soon as possible on the ground.

The modules further allow the system to determine, based at least in part on the analysis results, appeal factor values. The appeal factor values may be determined as indicated above for the apparatus and/or also based at least in part on AI analysis, the output of AI analysis, by-product data related to the output of AI analysis, or heat maps of appeal factor values. In some instances, the modules are further executable to generate or receive a layout of appeal factors and determine the appeal factor values based at least in part on the layout of appeal factors. Based at least in part on the appeal factor values, the modules also allow the determination of compression configurations. A compression configuration comprises compression algorithms, parameter values of a compression algorithm, and/or compression parameters, wherein the compression parameters include at least one of storage and/or transmission conditions, error conditions, or quality conditions. The modules allow to associate at least one appeal factor value with one or more parts of data and compress the one or more parts of data based at least in part on the appeal factor values using the corresponding compression configuration. Alternatively, the modules allow to associate compression configurations with one or more parts of data and compress the one or more parts of data based on the corresponding compression configuration.

In some instances, when the data comprises image data, such as images, sequences of images or SAR images, the AI analysis may provide, directly or indirectly, information of the importance or usefulness of pixels or group of pixels of the image or the sequence of images for a particular application or tasked performed by a satellite to determine or assign the appeal factor values or to associate compression configurations to one or more portions of data. The AI analysis may be performed by neural networks trained Earth-side and then instantiated and evaluated on satellites in flight, or the neural networks whose training is ongoing on-board the satellite during its operational lifecycle. In some instances, the analysis results include determining objects or features of interest on the surface on the Earth. When an object or feature of interest is identified, the appeal factor values may be determined based at least in part on a parameter, a frequency or a trigger condition related to the objects or features of interest on the surface on the Earth. Alternatively or additionally, the appeal factor values may be determined based at least in part on a map or layout of appeal factor values which correlates appeal factor values or ranges of appeal factor values to portions of image data corresponding to a geographical area or region on the surface of the Earth. The map of appeal factor values may be updated at preselected time intervals, areas or locations, based at least in part on pixel age, data acquisition opportunity cost, data acquisition patterns, or data, including meta-data. In some instances, the map of appeal factors comprises determining appeal factor values for a pixel or group of pixels of an image based at least in part on a geographical region on the Earth, an application the system is tasked to perform, objects or features of interest on an image, contextual information of objects or features of interest on an image, changes of objects or features of interest detected on an image or a sequence of images, and/or changes detected in the status of objects or features of interest.

Example Operations for the Apparatuses and Systems

Figure 4:
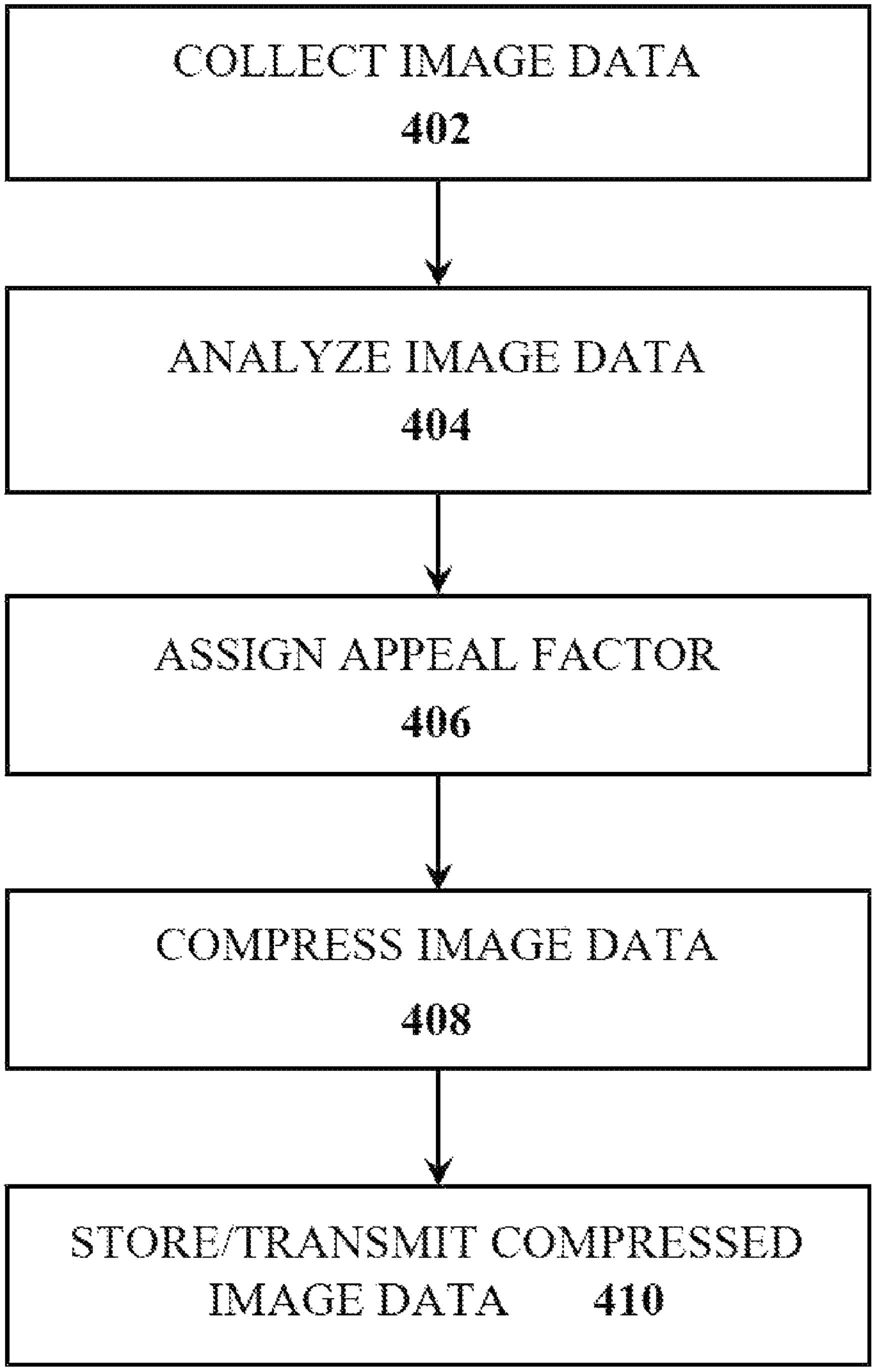
FIG. 4 is a flow diagram of an example process for selective satellite image data compression according to embodiments of the present disclosure.

FIG. 4 depicts a flow graph that shows an example process in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in an application specific integrated circuit (ASIC), a programmable logic device, such as a field programmable gate array (FPGA), graphical processing unit (GPU), tensor processing unit (TPU), or a software defined radio (SDR). Other examples of hardware may be used with the embodiments described herein and are contemplated herein as providing the features and benefits described. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph. Moreover, the operations may be carried out by a single system, such as onboard any manned or unmanned aerial, space, maritime or terrestrial vehicle such as a watercraft, a satellite, a spacecraft, an aircraft, or ground station, or may be shared between multiple systems located onboard one or more vehicles or ground based systems.

FIG. 4 is a flow diagram of an example process for selective satellite image data compression. At block 402, image data is collected. The image data may come from any imaging sensor, such as a SAR or optical imaging sensor. In some instances, the image data may have been received from a ground-based station or from another satellite.

At block 404, the image data may be analyzed. The image data may be analyzed on board the satellite, on a ground-based station or another vehicle such as another satellite, or the analysis may be shared partially on the satellite(s) and partially on the ground. One or more algorithms such as object detection algorithms, obstruction detection algorithms, or image analytics, may be run on the collected image data. For example, object detection algorithms may be run on the captured image data to detect objects or features of interest in the image data. This may include things like edge detection, agricultural detection, topographical features, human-made objects, and other such features or objects that may be present on image data. Obstruction detection algorithms may be run to identify obstructed and/or unobstructed areas of the image. Obstructions may include clouds, fog, haze, shade, dust, sand, or any form of obstruction that may prevent a view of the features of interest. In some implementations, said clouds, fog, haze, shade, dust, sand, or other elements can themselves correspond to the feature of interest. As used herein, an unobstructed view is one in which the feature of interest is visible with a certain acceptable degree. In many cases, an unobstructed view is one in which an imaging sensor aboard a satellite is able to capture a feature of interest with sufficient detail to perform analysis on the image. In some cases, this includes a view of Earth, and more particularly, a view of the surface of the Earth, or objects upon the surface of the Earth. This also includes objects or features above the surface of the Earth. Image analytics may be run on the image data to determine which areas or features are relevant for a given application and/or geographic location, and which are not. Alternatively or additionally, image analytics may be run to determine changes in the image data, for example, lake surface area, growing landmasses, buildings, the health of crops or forests, or increases in animal or human populations. The image data may be separated temporally in order to determine the changes in the image content. The information on the changes could also be used to determine whether the new sample contains new relevant information or not, and using different compressing factors or methods based on that.

At block 406, which is an optional step, an appeal factor may be assigned to (associated with) the image data. Based at least in part on the analysis results, the appeal factor values may be determined associated with the image data. An appeal factor may be selected for at least one portion of the image. The image comprises pixels and, in some instances, an appeal factor may be assigned to each pixel. Several methods may be used to assign an appeal factor to image data. Each image of a set of images may be assigned an appeal factor, subsets of the set of images may be assigned different appeal factors, or different portions or pixels of a single image may be assigned different appeal factors. Also, the images may be portions of images captured of an area of interest. An appeal factor or a range of appeal factors may be assigned to the image(s) according to the relevance of the image content. For example, a satellite may capture images and, after running an obstruction detection algorithm, may determine that some of all the images captured over a region of interest are obstructed by sand. The satellite may assign a particular value of appeal factor to the unobstructed images and another value of appeal factor to the obstructed images. Optionally, the satellite may assign different appeal factor values to the images in relation to the degree of obstruction i.e. the extent of area of the image obstructed by sand. The satellite may also run a segmentation algorithm and may first segment the images into segments comprising the geographical area of interest and areas not included in the area of interest. Hence, the set of images may comprise only the portions or segments of images comprising the geographical area of interest, and those portions of images may be assigned an appeal factor value for each portion of image, or may be assigned different appeal factor values for each pixel of the portions of images, or any combination of these.

The appeal factor or appeal factor value may be assigned to a feature or object of interest and the remaining elements of the image may be assigned a range of appeal factors. For example, where a satellite is tasked with monitoring oil tanks in a particular geographical region, the imaging sensor may capture an image corresponding to the field of view of the imaging sensor which generally includes a wider area than the geographical region of interest. Also, the objects of interest within the geographical region of interest may comprise an even smaller portion of the geographical region of interest. Hence, the satellite using one or more algorithms, for example edge or object detection algorithms, may segment the image data into different pixel sets, and may assign an appeal factor to each of the pixel sets. For instance, an appeal factor may be assigned to the set of pixels related to the geographical region of interest, another appeal factor may be assigned to the set of pixels related to the rest of the image captured by the field of view of the imaging sensor, also an appeal factor may be assigned to the oil tanks, and in some instances, given that only a particular area around the oil tanks is relevant, gradually varying values of appeal factors may be assigned to the pixels sets identifying areas around the oil tanks according to gradually varying distances out from the position of the oil tanks.

At block 408, the image data may be compressed, in some instances, depending on the image data content. For example, the satellite (or a ground-based station) may run different compression algorithms, however a particular compression algorithm to be applied to a whole or to portions of an image may be selected depending on the appeal factor (or range of appeal factors) assigned to it, or depending directly on the analysis results obtained at block 404. For example, a range of appeal factor may be equally divided comprising evenly distributed values, wherein the subdivision comprising the highest values of appeal factor may correspond to a portion of an image to be compressed with higher resolution (less compression loss factor) and the subdivision comprising the lowest values of appeal factor may correspond to a portion of the image to be compressed with less resolution (higher compression loss factor). The range of appeal factors may comprise a continuous or a discrete range of values. In some instances, a space of appeal factors may be determined. The space may comprise a set of one or more compression configurations including compression algorithms and compression parameters. The space may be a discrete space or a pseudo-continuous space. In some instances, the space may be divided using statistical measures including, but not limited to, percentiles, quartiles, and so forth.

At block 410, the compressed image data may be stored and/or transmitted. The compressed image data may be stored for further processing or for later transmission, or may be transmitted such as to a ground-based station or to another spacecraft. The compressed image data, and/or information related to the image data, may be transmitted at a later stage or in real time to a ground station, another satellite, or another receiver with which the satellite may be able to communicate in real time. The compressed image data may be a single compressed image, one or more compressed sub-images, or a set of compressed images or sub-images. In some instances, the image data (image or sub-image) that has been compressed may be transmitted in layers or blocks, wherein each layer or block has been compressed with a different compression configuration.

Embodiments include a method for selective data compression, comprising analyzing the data to create analysis results, determining, based at least in part on the analysis results, appeal factor values, associating at least one appeal factor value with the data, and compressing the data based at least in part on the appeal factor values. The method may further comprise determining, based at least in part on the appeal factor values, compression configurations, and associating the appeal factor values with the compression configurations. Embodiments also include a method for selective data compression, comprising analyzing the data to create analysis results; associating, based at least in part on the analysis results, compression configurations to one or more portions of data; and compressing the one or more portions of data using the corresponding compression configurations, without having the explicit intermediate step of determining or assigning one or more appeal factors to portions of data or all the data. In some instances, the data associated with the appeal factor values or the compression configurations may be divided or grouped into mask or contour lines so that the data is compressed based on the masks or contour lines. The method may further comprise generating one or more masks, in some instances based on the appeal factor values, associating one or more masks of the one or more masks with at least one compression configuration, multiplying at least one image by one or more of the one or more masks; and compressing each of the multiplied images using the compression configuration associated with the one or more masks. In some embodiments, the data may be divided, in some instances based on the appeal factor values, in one or more blocks of the same or different size. The one or more blocks may be associated with a compression configuration so that the blocks are compressed based on the compression configuration. In some instances, an appeal factor value for each of the one or more blocks may be determined. Appeal factor values of the one or more blocks may be associated with compression configurations; and the one or more blocks may be compressed based on the appeal factor values.

The method may further or alternatively comprise dividing, based on the appeal factor values, the data in one or more contour lines, associating one or more contour lines with a compression configuration; and compressing the data based on the one or more contour lines. Each contour line may comprise portions of data delimited by predetermined threshold appeal factor values as illustrated elsewhere in the Detailed Description. In some instances, the contour lines may be divided in one or more blocks having the same or different sizes; each of the one or more blocks may be assigned an appeal factor value based on the appeal factors included in each block; the appeal factor values may be associated with one or more compression configurations; and the one or more blocks may be compressed based on the appeal factor value.

In some embodiments, the data or portions of data (e.g. images or sub-images) may be compressed by generating one or more sets of compressed data or compressed data units for the data or portions of data, such that each compressed data of the set of compressed data is compressed based on the loss or difference accumulated throughout the set of compressed data in a way that the whole set of compressed data represents the data or sets of compressed data represent the portions of data.

In the descriptions above and in the claims, phrases such as “at least one of” or “one or more of” may occur followed by a conjunctive list of elements or features. The term “and/or” may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases “at least one of A and B”, “at least one of A or B”, “one or more of A and B”, and “A and/or B’ are each intended to mean “A alone, B alone, or A and B together.” A similar interpretation is also intended for lists including three or more items. For example, the phrases “at least one of A, B, and C”, “at least one of A, B, or C”, “one or more of A, B, and C” and “A, B, and/or C” are each intended to mean “A alone, B alone, C alone, A and B together, A and C together, B and C together, or A and B and C together.” In addition, use of the term “based on” above and in the claims is intended to mean “based at least in part on”, such that an unrecited feature or element is also permissible.

CONCLUSION

The subject matter described herein can be embodied in systems, apparatus, methods, and/or articles depending on the desired configuration. Although the disclosure uses language that is specific to structural features and/or methodological acts, the invention is not limited to the specific features or acts described. Rather, the specific features and acts are disclosed as illustrative forms of implementing the subject matter described herein. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system for selective data compression, the system comprising:

one or more processors; and a memory coupled to the one or more processors, the memory including one or more modules that are executable by the one or more processors to:

analyze one or more parts of data to create analysis results;

assign, based at least in part on the analysis results, at least one appeal factor value or at least one range of appeal factor values to the one or more parts of the data;

associate at least one compression configuration with the at least one appeal factor value or the at least one range of appeal factor values; and compress the one or more parts of the data based at least in part on the at least one compression configuration to obtain compressed one or more parts of the data;

wherein the at least one appeal factor value or the at least one range of appeal factor values provide information about a level of importance, significance, or usefulness associated with the one or more parts of the data, based at least in part on at least one of: a priori information, an application the system is tasked to perform, content of the data, artificial intelligence (AI) analysis, an output of AI analysis, by-product data related to the output of AI analysis, heat maps of appeal factor values, a database, or at least one characteristic of interest.

2. The system according to claim 1, wherein the analysis results comprise at least one of radiofrequency (RF) data analysis, image data analysis, sound data analysis, meta-data analysis, substance analysis, sensor data analysis, and artificial intelligence (AI) analysis.

3. The system according to claim 1, wherein the database is updated according to at least one of predetermined time intervals, predetermined areas, predetermined locations, pixel age, data acquisition opportunity cost, or data acquisition patterns.

4. The system according to claim 1, further comprising:

at least one imaging sensor; and wherein the one or more modules are further executable by the one or more processors to:

acquire, by the at least one imaging sensor, image data, wherein the analysis of the one or more parts of the data to create analysis results comprises the analysis of the image data to identify the at least one characteristic of interest; and wherein the association of the at least one compression configuration with the at least one appeal factor value or the at least one range of appeal factor values is done based at least in part on the characteristic of interest or properties, parameters or conditions caused by, or related to, the at least one characteristic of interest.

5. The system according to claim 4, further comprising manned or unmanned ground, maritime, aerial or space vehicles, wherein the at least one imaging sensor is on-board at least one of the manned or unmanned ground, maritime, aerial, or space vehicles.

6. The system according to claim 4, wherein properties, parameters or conditions caused by, or related to, the at least one characteristic of interest comprises information related to at least one of a list comprising: image characteristics, an object or feature of interest on the image data, a geographical region of the Earth or target celestial body, a temperature of the system, data from other sensors in the system, exposure time of image capture, an application the system is tasked to perform, contextual information of objects or features of interest on the image data, changes of objects or features of interest detected on an image or a sequence of images of the image data, changes detected in the status of objects or features of interest, or periods of time of image capture.

7. The system according to claim 4, wherein the analysis of the image data comprises comparing the image data with received and/or acquired data, reference data, or multi-temporal imagery data sets to identify at least one change on the at least one characteristic of interest, and the association of the at least one compression configuration with the at least one appeal factor value or the at least one range of appeal factor values is based on the identified at least one change.

8. The system according to claim 1, wherein the one or more modules are further executable by the one or more processors to compress the one or more parts of the data by generating a set of compressed data units such that each compressed data unit of the set of compressed data units is compressed based on a loss or difference accumulated throughout the set of compressed data units.

9. A satellite comprising:

one or more processors; and memory coupled to the one or more processors, the memory including one or more modules that are executable by the one or more processors to:

analyze data to create analysis results;

associate, based at least in part on the analysis results, at least one compression configuration with the one or more parts of the data; and compress the data or the one or more parts of the data based at least in part on the at least one compression configuration to obtain compressed one or more parts of the data;

wherein the at least one compression configuration is associated with the one or more parts of the data based at least in part on artificial intelligence (AI) analysis, the output of AI analysis, by-product data related to the output of AI analysis, or heat maps or databases of levels of importance, significance, or usefulness associated with the one or more parts of the data.

10. The satellite according to claim 9, wherein the analysis results comprise at least one of radiofrequency (RF) data analysis, image data analysis, artificial intelligence (AI) analysis, meta-data analysis, substance analysis and sensor data analysis.

11. The satellite according to claim 9, wherein the data comprises an image or a sequence of images and the AI analysis provides, directly or indirectly, information of the importance or usefulness of pixels or group of pixels of the image or the sequence of images for a particular application or task to be performed by the satellite to associate the at least one compression configuration with the one or more parts of the data.

12. The satellite according to claim 9, wherein the AI analysis is performed by neural networks trained Earth-side and then instantiated and evaluated on the satellite in flight, or neural networks whose training or re-training is ongoing on-board the satellite during its operational lifecycle.

13. The satellite according to claim 9, wherein to associate the at least one compression configuration with the one or more parts of the data, the one or more modules are further executable by the one or more processors to assign, based at least in part on the analysis results, appeal factor values or at least one range of appeal factor values to the one or more parts of the data, and associate the at least one compression configuration to the at least one appeal factor value or the at least one range of appeal factor values.

14. The satellite according to claim 13, wherein the one or more modules are further executable by the one or more processors to generate or receive a map of appeal factor values and assign, based at least in part on the map of appeal factor values, the appeal factor values or the at least one range of appeal factor values to the one or more parts of the data.

15. The satellite according to claim 14, wherein the map of appeal factor values is dynamically updated at predetermined times, areas or locations, based at least in part on pixel age, data acquisition opportunity cost, or data acquisition patterns.

16. The satellite according to claim 14, wherein the one or more modules are further executable by the one or more processors to assign, from the map of appeal factor values, appeal factor values for a pixel or group of pixels of an image based at least in part on a geographical region on the Earth, an application the satellite is tasked to perform, objects or features of interest on an image, contextual information of objects or features of interest on an image, changes of objects or features of interest detected on an image or a sequence of images, and/or changes detected in the status of objects or features of interest.

17. The satellite according to claim 9, wherein the data comprises imaging data and the analysis results include determining objects or features of interest on the surface on the Earth or target celestial body, and wherein the at least one compression configuration is associated with the one or more parts of the data based at least in part on a parameter, a frequency or a trigger condition related to the objects or features of interest on the surface on the Earth or target celestial body.

18. The satellite according to claim 9, wherein the one or more modules are further executable by the one or more processors to compress the one or more parts of the data by generating a set of compressed data units such that each compressed data unit of the set of compressed data units is compressed based on a loss or difference accumulated throughout the set of compressed data units.

19. The satellite according to claim 9, wherein the one or more modules are further executable by the one or more processors to determine the at least one compression configuration by selecting compression algorithms, parameter values of a compression algorithm, and/or compression parameters, and wherein the compression parameters include at least one of storage and/or transmission conditions, error conditions, or quality conditions, such as a maximum acceptable compression loss.

20. A computer-implemented method for selective data compression, comprising:

analyzing one or more parts of data to create analysis results;

dividing, based at least in part on the analysis results, the one or more parts of data in one or more blocks of regular or irregular shape and of the same or different size;

determining at least one block appeal factor value for the one or more blocks;

associating at least one compression configuration with the at least one block appeal factor value; and compressing the one or more blocks based at least in part on the at least one compression configuration associated with the at least one block appeal factor value to obtain compressed data.

21. The method according to claim 20, wherein the data comprises image data comprising an image or sequence of images, the method further comprising:

generating one or more masks;

dividing the one or more masks in the one or more blocks;

associating each of the one or more masks with the at least one block appeal factor value associated with the at least one compression configuration;

multiplying the image or at least one image of the sequence of images by each of the one or more masks; and compressing each of the multiplied images using the at least one compression configuration associated with the at least one block appeal factor value associated with the one or more masks.

22. The method according to claim 20, further comprising:

dividing, based on the at least one block appeal factor value, the data in one or more contour lines;

associating at least one contour line of the one or more contour lines with an appeal factor value of the at least one block appeal factor value associated with the at least one compression configuration; and compressing the data based on the one or more contour lines;

wherein each contour line comprises portions of the data delimited by predetermined threshold appeal factor values.

23. The method according to claim 22, wherein the one or more contour lines are further divided in the one or more blocks having the same or different sizes; each of the one or more blocks is assigned a block appeal factor value based on the appeal factor values included in each block; the block appeal factor values are associated with one or more compression configurations of the at least one compression configuration; and the one or more blocks are compressed based on each block appeal factor value.

24. The method according to claim 20, wherein compressing the one or more parts of the data comprises generating a set of compressed data units such that each compressed data unit of the set of compressed data units is compressed based on a loss or difference accumulated throughout the set of compressed data units in a way that the whole set of compressed data represents the data or the parts of the data.

25. The method according to claim 24, wherein compressing the one or more parts of the data comprises:

a) compressing the one or more parts portions of the data with a first compression configuration associated with a first appeal factor value to obtain a first compressed unit and a first difference unit;

b) compressing the first difference unit with a second compression configuration and a second appeal factor value, the second compression configuration and the second appeal factor value being the same as or different from the first compression configuration and the first appeal factor value; and c) repeat steps a) and b) starting from each subsequent difference unit, with same or different compression configurations and appeal factor values, until a difference unit is obtained with an amount of information lower than a difference threshold, wherein optionally the difference threshold is related to the appeal factor values.

* * * * *